United States Patent
Josyula

(10) Patent No.: US 10,361,879 B2
(45) Date of Patent: Jul. 23, 2019

(54) PERSONA-BASED SERVICE DELIVERY

(71) Applicant: FUJITSU LIMITED, Kawasaki-shi, Kanagawa (JP)

(72) Inventor: Surya Josyula, Cupertino, CA (US)

(73) Assignee: FUJITSU LIMITED, Kawasaki (JP)

( * ) Notice: Subject to any disclaimer, the term of this patent is extended or adjusted under 35 U.S.C. 154(b) by 294 days.

(21) Appl. No.: 15/350,049

(22) Filed: Nov. 12, 2016

(65) Prior Publication Data

US 2018/0139067 A1    May 17, 2018

(51) Int. Cl.
| | |
|---|---|
| G05B 19/00 | (2006.01) |
| H04L 12/28 | (2006.01) |
| G05B 19/042 | (2006.01) |
| H04L 29/08 | (2006.01) |
| H04M 3/42 | (2006.01) |
| H04W 4/021 | (2018.01) |

(52) U.S. Cl.
CPC ........ *H04L 12/282* (2013.01); *G05B 19/0426* (2013.01); *H04L 12/2829* (2013.01); *H04L 67/10* (2013.01); *H04L 67/125* (2013.01); *H04L 67/22* (2013.01); *H04L 67/24* (2013.01); *H04L 67/306* (2013.01); *H04M 3/42178* (2013.01); *G05B 2219/2642* (2013.01); *H04W 4/021* (2013.01)

(58) Field of Classification Search
CPC ... H04L 12/282; H04L 12/2829; H04L 67/22; H04L 67/24; H04L 67/125; H04L 67/306; H04L 67/10; G05B 19/0426; G05B 2219/2642; H04M 3/42178; H04W 4/021

USPC ........................................... 700/276
See application file for complete search history.

(56) References Cited

U.S. PATENT DOCUMENTS

| | | | | |
|---|---|---|---|---|
| 8,996,429 B1 * | 3/2015 | Francis, Jr. | ............ | G06N 3/008 706/12 |
| 2010/0275130 A1 | 10/2010 | McBride | | |
| 2015/0356407 A1 | 12/2015 | Faith et al. | | |
| 2015/0356408 A1 | 12/2015 | Faith et al. | | |

FOREIGN PATENT DOCUMENTS

WO    2000072227 A2    11/2000

* cited by examiner

*Primary Examiner* — Vu A Vu
(74) *Attorney, Agent, or Firm* — Mashoff Brennan

(57) ABSTRACT

A method of persona-based service delivery includes receiving use data from a sensor and from a service device while a user interacts with the service device in a current environment. Based on the use data, the method includes developing, a preference that reflects the interaction by the user with the service device as monitored by the sensor. Based on the preference, the method includes developing a command instruction that modifies a physical operational condition of the service device consistent with the preference. The method includes storing a persona specific to the user, the persona including the preference and the command instruction for the user in the current environment. The method includes subsequently receiving collected data that includes a user characteristic of the user in the current environment. In response to receipt of the collected data, the method includes downloading the persona of the user to the sensor.

18 Claims, 14 Drawing Sheets

PERSONA-BASED SERVICE DELIVERY

FIELD

The embodiments discussed herein are related to persona-based service delivery.

BACKGROUND

Sensors and devices regularly interact with users in environments such as houses and vehicles. However, the sensors and devices are manipulated manually by the user to configure the devices in accordance with a preference of the user.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of persona-based service delivery includes receiving, by a cloud-based server, use data from a sensor and from a service device while a particular user interacts with the service device in a current environment. The sensor monitors the current environment. The service device is located in the current environment. Based on the use data, the method may include developing, by the cloud-based server, a preference of the particular user that reflects the interaction by the particular user with the service device as monitored by the sensor. Based on the preference, the method may include further developing, by the cloud-based server, a command instruction that is configured to modify a physical operational condition of the service device consistent with the preference upon receipt of the command instruction. The method may include storing, by the cloud-based server, a persona that is specific to the particular user, the persona including the preference and the command instruction for the particular user in the current environment. The method may include subsequently receiving, by the cloud-based server, collected data that includes a user characteristic of the particular user in the current environment from the sensor in the current environment. In response to receipt of the collected data, the method may include downloading, by the cloud-based server, the persona of the particular user to the sensor.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Sensors and service devices that include Internet of Things (IoT) capabilities are becoming ubiquitous. The sensors and service devices enable services to be delivered to users in various environments in a customized fashion. For instance, such services may be delivered that are based on a preference that is specific to the user.

An issue in delivering the services to the user in the customized fashion is the communication of the preferences of the user to the sensors and the service devices that are relevant to an environment and yet customized to the user. For example, a lighting brightness preference may be relevant to an office environment, but may not be relevant to a vehicle environment. Accordingly, embodiments described in this disclosure include persona-based service delivery. In some embodiments, services are delivered to the user based on a persona that "travels" with the user between environments. The persona is stored on a cloud-based server and is downloaded to the sensors and/or the service devices. The persona programs the sensors and/or the service devices using command instructions to adapt the environment and deliver services that are customized to the user. The persona may be based on and may be updated based on interaction of the user with the sensors and service devices. Thus, the persona evolves to better-customized services.

Accordingly, some embodiments described in this disclosure provide an improvement to environmental adaption and customized service delivery. In particular, some embodiments improve access to a set of preferences and command instructions that are specific to a particular user. Moreover, some embodiments improve development of a persona that is specific to the user and a process of updating the persona on an on-going basis to improve and evolve the environmental adaptation and services provided to the user. These and other embodiments provide a technical solution to decentralized preferences that are not communicated among sensors and service devices of different environments.

These and other embodiments are described with reference to the appended figures. Like item numbers in the appended figures indicate like structures and functionality unless described otherwise.

Figure 1:
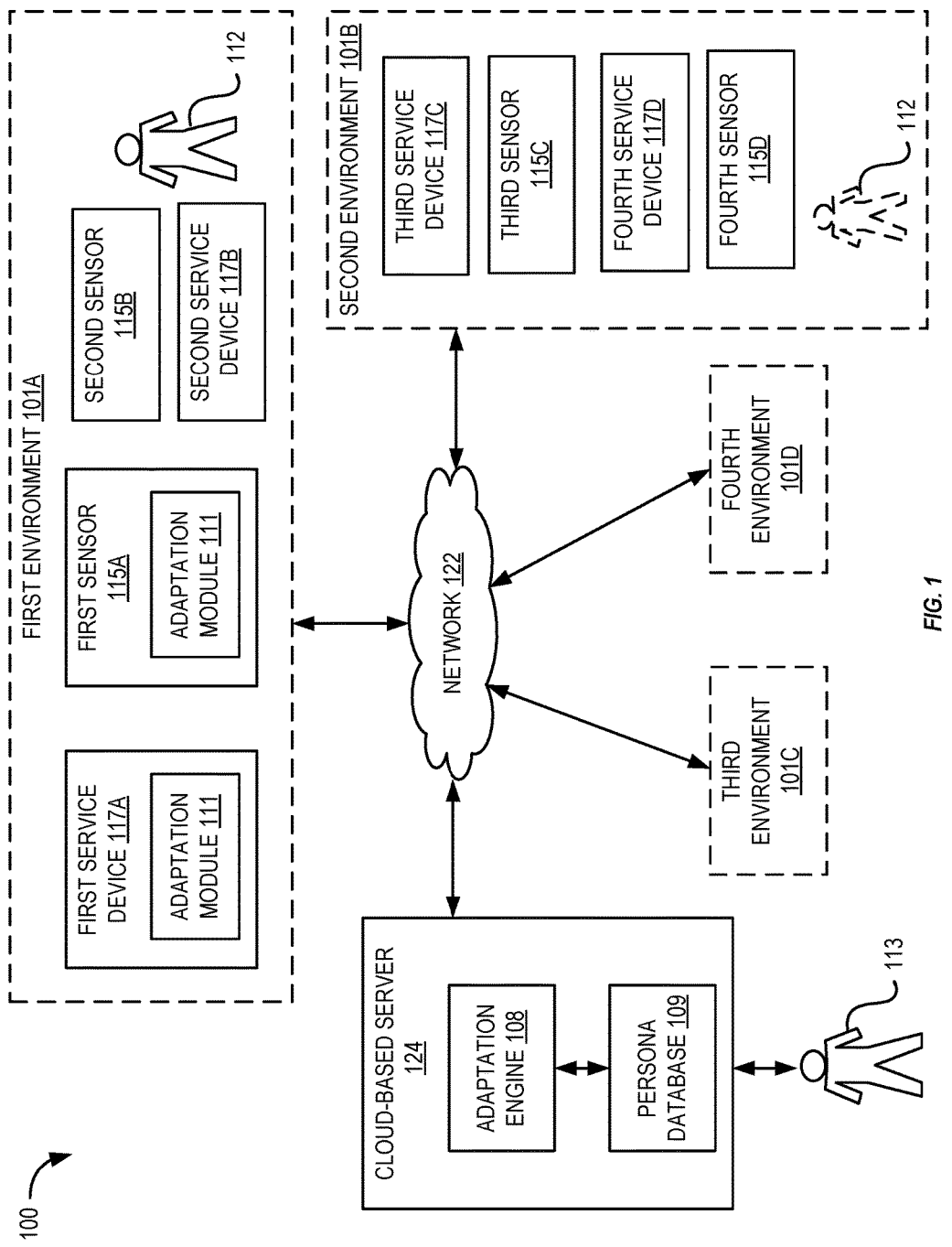
FIG. 1 is an example service delivery system in which embodiments of persona-based service delivery may be implemented.

FIG. 1 is an example service delivery system 100 in which embodiments of persona-based service delivery may be implemented. The service delivery system 100 includes multiple environments 101A-101D (generally, environment 101) in which a user 112 may interact. For instance, the environments 101 may include multiple rooms of a house of the user 112. As the user 112 walks around the house, the user 112 may interact with the environments 101 that may adapt to deliver services to the user 112 in real time or substantially real time.

The service delivery system 100 of FIG. 1 includes the environments 101, a cloud-based server 124, and a network 122. Some details of each of the environments 101, the cloud-based server 124, and the network 122 are provided in the following paragraphs.

The environments 101 may include any setting, situation, or location that includes at least one of the sensors 115 and at least one of the service devices 117. For instance, the environments 101 may include a vehicle (e.g., car, boat, motorcycle, etc.), a clinical environment (e.g., hospital, veterinarian clinic, chiropractor, doctor's office, etc.), a work environment (e.g., office, conference room, work station, factory workspace, etc.), a shopping environment (e.g., a store, a mall, a market, etc.), or a residential environment (e.g., a home, an apartment, a park, a yard, etc.). The environment 101 in which the user 112 is currently interacting is referred to in this disclosure as the environment 101 or the current environment 101.

The environments 101 may include service devices 117A-117D (generally, service device 117 or service devices 117) and sensors 115A-115D (generally, sensor 115 or sensors 115). The service devices 117 and the sensors 115 are only shown in a first environment 101A and a second environment 101B. It may be understood with the benefit of this disclosure that a third environment 101C and a fourth environment 101D may include service devices 117 and sensors 115. Additionally, the first and second environments 101A and 101B include two each service devices 117 and sensors 115. The environments 101 may include one or more service devices 117 and/or one or more sensors 115.

The sensor 115 may include any device that is configured to receive or measure input in the environment 101 and communicate the data or information representative of the input via the network 122. The sensor 115 may include a processor, memory, and computing capabilities. The sensor 115 may be configured to measure presence of the user 112 in the environment 101. For example, the sensor 115 may include a motion sensor. The sensor 115 may communicate an activation signal to another of the sensors 115. Upon receipt of the activation signal, a sensor 115 may collect input from the environment 101.

Additionally, the sensor 115 may be configured to measure a particular environmental condition (e.g., temperature, lighting brightness, and the like). The sensor 115 may be further configured to receive the persona from the cloud-based server 124. Based on the persona, the sensor 115 may communicate a command instruction to the service device 117, which may modify a physical operational condition of the service device 117. Additionally or alternatively, based on the persona, the sensor 115 may be configured to communicate a download initiation command to the service device 117, which may initiate download of the persona by the service device 117. Additionally still, in some embodiments, the sensor 115 may be configured to monitor the environment 101. Based on monitor of the environment, the sensor 115 may extract use data and communicate the use data to the cloud-based server 124. The use data may form the basis of the persona and may form the basis of updates to the persona. Some details of some of these functionalities are described elsewhere in this disclosure.

In some embodiments, the sensor 115 may include an adaptation module 111. The adaptation module 111 may be configured to interface with the cloud-based server 124 to implement adaptation of the environment 101. For example, the adaptation module 111 may monitor a current environment 101. The adaptation module 111 may collect data that includes a user characteristic of a particular user in the current environment 101. The adaptation module 111 may download a persona of the particular user stored on the cloud-based server 124. The persona may include a preference and/or a command instruction configured to modify a physical operational condition of the service device 117 in the current environment upon receipt of the command instruction.

The service device 117 may include any device that provides or affects a condition in the environment 101. Generally, the condition is experienced by the user 112 such that the user 112 may form some preference regarding the condition. The service device 117 may include a processor, memory, and computing capabilities.

In some embodiments, the service device 117 may include the adaptation module 111 that may be configured to interface with the cloud-based server 124 and/or the sensor 115. For example, the adaptation module 111 of the service device 117 may be configured to receive a command instruction from the sensor 115. In response, the adaptation module 111 of the service device 117 may modify the physical operational condition. In addition, the adaptation module 111 of the service device 117 may be configured to receive a download initiation command from the sensor 115. In response, the adaptation module 111 of the service device 117 may download the persona from the cloud-based server 124. The service device 117 may then modify the physical operation condition based on the downloaded persona. Additionally still, in some embodiments, the adaptation module 111 of the service device 117 may be configured to monitor the environment 101. Based on monitor of the environment, the service device 117 may extract use data and communicate the use data to the cloud-based server 124, from which the persona is developed and which may form the basis of updates to the persona. Some details of some of these functionalities are described elsewhere in this disclosure.

Some examples of the service device 117 include a home entry device, garage door opener, vehicle keyless ignition, a vehicle interior component configuration, navigation settings, a heating ventilation and air conditioning (HVAC) device, a refrigerator, a coffee maker, a washing machine, a light, a lighting control device, a keyless ignition, a vehicle operator entertainment device, a navigation device, a vehicle HVAC device, a computing device, a conference room device, a thermostat, and a productivity tool.

The adaptation module 111 may be implemented using hardware including a processor, a microprocessor (e.g., to perform or control performance of one or more operations), a field-programmable gate array (FPGA), or an application-specific integrated circuit (ASIC). In some other instances, the adaptation module 111 may be implemented using a combination of hardware and software. Implementation in software may include rapid activation and deactivation of one or more transistors or transistor elements such as may be included in hardware of a computing system (e.g., the sensors 115 and/or service devices 117). Additionally, software defined instructions may operate on information within transistor elements. Implementation of software instructions may at least temporarily reconfigure electronic pathways and transform computing hardware.

The cloud-based server 124 may include a hardware server that includes a processor, memory, and communication capabilities. In the illustrated embodiments, the cloud-based server 124 may be coupled to the network 122 to send and receive data and information to and from the service devices 117 and the sensors 115 via the network 122.

The cloud-based server 124 may host an adaptation engine 108 and a persona database 109. The adaptation engine 108 may be configured to develop a persona that is specific to the user 112. The persona database 109 may store one or more personas, one of which being specific to the user 112. As the user 112 interacts within the environments 101, the adaptation engine 108 may enable access to or download of the persona of the user 112 by the service devices 117 and/or the sensors 115 via the network 122 in real time or substantially real time.

Based on the persona of the user 112, a physical operational condition of the service devices 117 may be modified. The modification to the service device 117 may adapt the environment 101 to better suit the user 112 or to provide a service to the user 112 in the environment 101. The cloud-based server 124 may be generally accessible by the service devices 117 and/or the sensors 115 of the environments 101 via the network 122. For example, the cloud-based server 124 may be configured for communication with smart appliances, Internet-of-Things (IoT) capable devices, etc. via the network 122. Accordingly, the environments 101 may be distinct and remote from one another.

As used in this disclosure, the persona may include preferences of the user 112. The preferences may include any information or data that relates to the user 112 and that may be represented by a change in an operational condition of the service devices 117. The persona may include various verification data such as user characteristics (e.g., facial recognition, finger print, password, etc.) that are used to confirm the user 112 is present in the environment 101. Moreover, the persona may include command instructions 212 used for modification of the operational condition of the service devices 117. The persona may provide preferences, etc. that may prompt change in the operational condition in one or more of the environments 101. For example, the preferences may be used to change an operational condition in the first environment 101A and the third environment 101C, but not in the second environment 101B.

The personas may include preferences that may be relevant in one or more of the environments 101. For instance the preferences may include data related to home entry information, HVAC preferences, alarm codes, smart appliance auto settings (e.g., refrigerator, coffee machine, washer), and lighting control, which may be relevant in the residential environment. The preferences may include data related to a health record, medications, allergies, PCP information, lab tests and appointments, and preferred specialists, which may be relevant in a clinical environment. The preferences may include data related to keyless ignition, comfort settings, destination settings, and driver entertainment, which may be related to a vehicle environment. The preferences may include data related to computer access, conference room preferences, temperature and lighting settings, and productivity tool settings, which may be relevant in a work environment. The preferences may include data related to brand preferences, buying patterns, preferred stores, shopping lists, coupons, and payment methods, which may be relevant in a shopping environment.

The adaptation engine 108 may be configured to develop the persona based on use data transmitted by the sensors 115 and/or the service devices 117, adapt the environment 101 in real time or substantially real time based on the persona such that customized services are delivered, and dynamically update the persona based on additional use data.

For example, the adaptation engine 108 may receive use data from the sensor 115 that monitors the current environment 101 and/or from the service device 117 that is located in the current environment 101 while the user 112 interacts with the service device 117 in the current environment 101. Based on the use data, adaptation engine 108 may develop a preference of the user 112 that reflects the interaction by the user 112 with the service device 117 as monitored by the sensor 115. Based on the preference, adaptation engine 108 may develop a command instruction that is configured to modify a physical operational condition of the service device 117 consistent with the preference upon receipt of the command instruction. The adaptation engine 108 may store a persona that is specific to the user 112. The persona may include the preference and the command instruction for the particular user in the current environment 101. The adaptation engine 108 may subsequently receive collected data. The collected data may include a user characteristic of the user 112. In response to receipt of the collected data, adaptation engine 108 may download the persona of the user to the sensor 115 and/or the service device 117. The persona may be downloaded in real time or substantially real time. Based on the persona, a physical operational condition of the service device may be modified to better suit the user 112.

In addition, an administrator 113 may interface with the cloud-based server 124. The administrator 113 may provide user-specific data to the cloud-based server 124. The user-specific data may include records or other non-use data that may be used in the development of the persona. For instance, the administrator 113 may upload a medical record to the cloud-based server 124, which may be used in one or more preferences. Some other examples of user-specific data may include records (driving, medical, dental, etc.), demographic data (age, weight, family history, etc.), schedules (e.g., calendars, appointments, etc.), manually input preferences (e.g., favorite colors, etc.); purchasing history/receipts, and the like. In the service delivery system 100 of FIG. 1, the administrator 113 is depicted as an individual. In other embodiments, the administrator 113 may be a device (e.g., a scanner), an automated process, or a set of individuals. Additionally or alternatively, the user 112 may provide the user-specific data in some embodiments.

The adaptation engine 108 may be implemented using hardware including a processor, a microprocessor (e.g., to perform or control performance of one or more operations), an FPGA, or an ASIC. In some other instances, the adaptation engine 108 may be implemented using a combination of hardware and software. Implementation in software may include rapid activation and deactivation of one or more transistors or transistor elements such as may be included in hardware of a computing system (e.g., the cloud-based server 124). Additionally, software defined instructions may operate on information within transistor elements. Implementation of software instructions may at least temporarily reconfigure electronic pathways and transform computing hardware.

In the service delivery system 100 of FIG. 1, the cloud-based server 124 may communicate with the service devices 117 and/or the sensors 115 of the environments 101 via the network 122. For example, the cloud-based server 124 may communicate the persona to the service devices 117 and/or the sensors 115 via the network 122. Additionally, the service devices 117 and/or the sensors 115 may communicate data to the cloud-based server 124 via the network 122. Additionally still, the service devices 117 and the sensors 115 may communicate data, information, commands, etc. between the service devices 117 and the sensors 115 via the network 122.

Accordingly, the network 122 may include wired or wireless configurations, and may have configurations including a star configuration, token ring configuration, or other configurations. Furthermore, the network 122 may include a local area network (LAN), a wide area network (WAN) (e.g., the Internet), and/or other interconnected data paths across which multiple devices may communicate. In some embodiments, the network 122 may include a peer-to-peer network. The network 122 may also be coupled to or include portions of a telecommunications network that may enable communication of data in a variety of different communication protocols.

In some embodiments, the network 122 may be configured for automation protocols or device-to-device (D2D) protocols. For example, the D2D protocol may include Message Queue Telemetry Transport (MQTT), Extensible Messaging and Presence Protocol (XMPP), Data Distribution Service (DDS), Advanced Message Queuing Protocol (AMQP), and the like.

In some embodiments, the network 122 includes BLUETOOTH® communication networks and/or cellular communication networks for sending and receiving data including via short messaging service (SMS), multimedia messaging service (MMS), hypertext transfer protocol (HTTP), direct data connection, wireless application protocol (WAP), e-mail, etc.

Modifications, additions, or omissions may be made to the service delivery system 100 without departing from the scope of the present disclosure. The present disclosure may apply to a service delivery system that may include one or more environments 101, one or more networks 122, and one or more cloud-based servers 124, or any combination thereof.

Moreover, the separation of various components in the embodiments described herein is not meant to indicate that the separation occurs in all embodiments. It may be understood with the benefit of this disclosure that the described components may be integrated together in a single component or separated into multiple components.

Figure 2A:
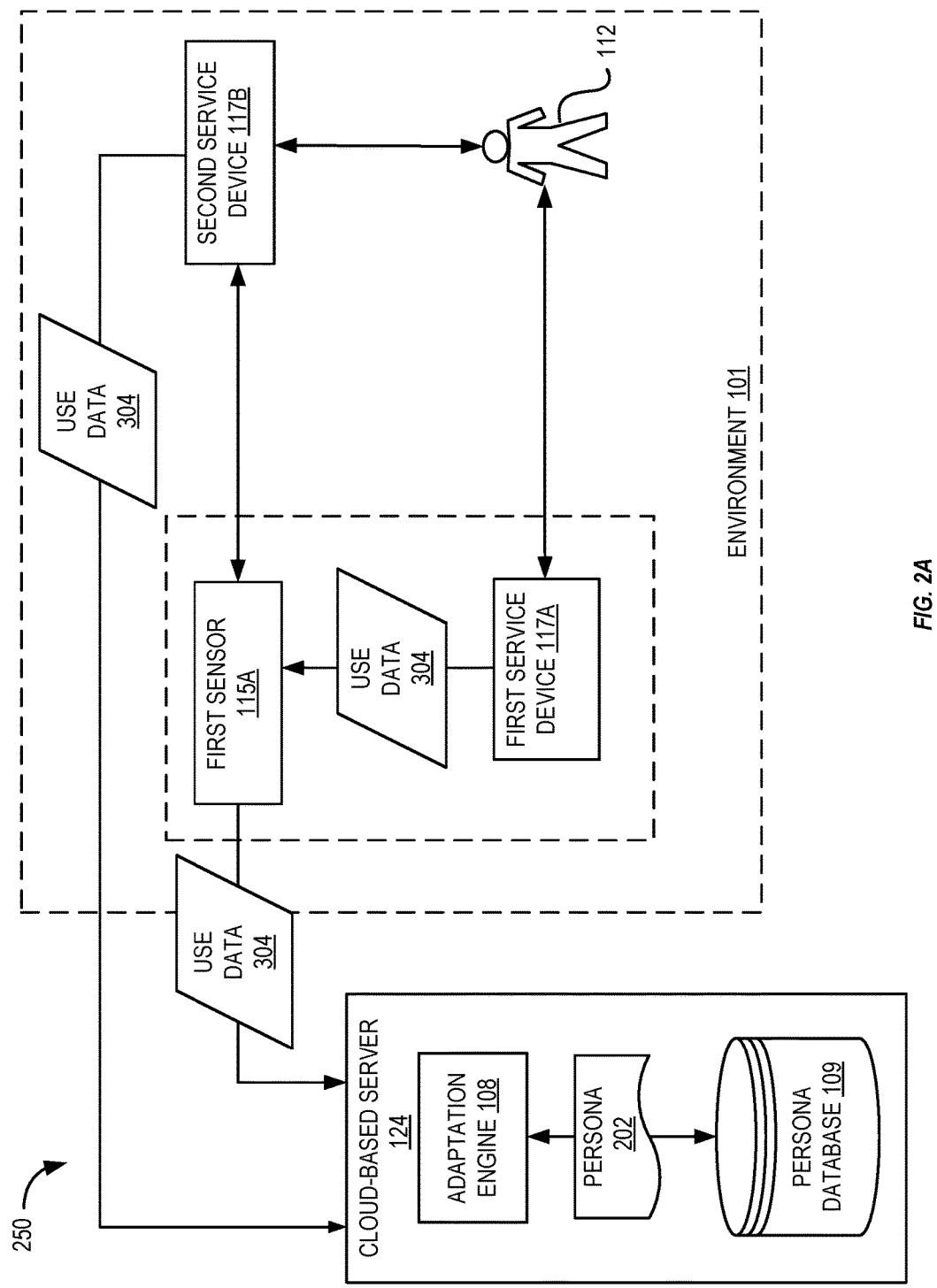
FIG. 2A is a block diagram of an example persona development process that may be performed in the service delivery system of FIG. 1.

FIG. 2A is a block diagram of an example persona development process 250 that may be performed in the service delivery system 100 of FIG. 1. The persona development process 250 of FIG. 2A may be used to dynamically develop a persona 202 that is stored on the persona database 109. Using the persona development process 250, the personas in the persona database 109 may be developed based on behaviors of the user 112 and in particular on interaction with the sensors 115 and the service devices 117 in the environment 101. Accordingly, as preferences of the user 112 develop, the persona 202 for the user 112 may be developed to reflect that preference.

FIG. 2A includes the cloud-based server 124, the adaptation engine 108, the persona database 109, the first sensor 115A, the first service device 117A, the user 112, the environment 101, and the second service device 117B described in FIG. 1. Although not shown in FIG. 2A, communication of use data 304 in the update process 275 may be via a network such as the network 122 of FIG. 1.

The persona development process 250 may be based on one or more of the first service device 117A, the first sensor 115A, and second service device 117B, monitoring the environment 101. For example, while the particular user 112 interacts with the first service device 117A, the first sensor 115A, and second service device 117B, the use data 304 may be generated. The use data 304 may include physical operational conditions of the first service device 117A, the first sensor 115A, and second service device 117B during use by the particular user 112. The use data 304 may be indicative of the behavior of the user 112 with respect to the first service device 117A, the second service device 117B, and the first sensor 115A. Accordingly, the use data 304 may be indicative of preferences of the user 112.

The first service device 117A, the first sensor 115A, and second service device 117B may extract the use data 304 and transmit the use data 304 to the cloud-based server 124. In FIG. 2A, for example, the second service device 117B may extract the use data 304 based on interaction of the user 112 with the second service device 117B. The use data 304 may then be transmitted to the cloud-based server 124. Similarly, the first service device 117A may extract the use data 304 based on interaction of the user 112 with the first service device 117A and the first sensor 115A. The use data 304 may then be transmitted to the cloud-based server 124.

Monitoring of the environment 101 and/or transmission of the use data 304 may be performed continually in some embodiments. In other embodiments, one or more service devices 117 and/or sensors 115 may periodically monitor or monitor on demand.

At the cloud-based server 124, the persona 202 may be developed based on the use data 304. For example, the adaptation engine 108 may generate the persona 202 based on the use data 304. The persona 202 may be communicated to the persona database 109. The persona 202 may include preferences, validation data, and command instruction for one or more environments (e.g., the environment 101). The persona 202 may accordingly be based on interaction of the user 112 with the service devices 117A and 117B and/or the sensors 115A.

For example, during a given period of time, the user 112 may have a thermostat set to 77 degrees Fahrenheit. The thermostat may extract use data 304 indicating the use of the thermostat at 77 degrees. The use data 304 may be communicated to the cloud-based server 124. The adaptation engine 108 may develop the persona 202 to include a preference of the thermostat at 77 degrees. In addition, the persona 202 may include a command instruction that changes a current setting of a thermostat to 77 degrees in response to the user 112 being present in the environment 101.

Figure 2B:
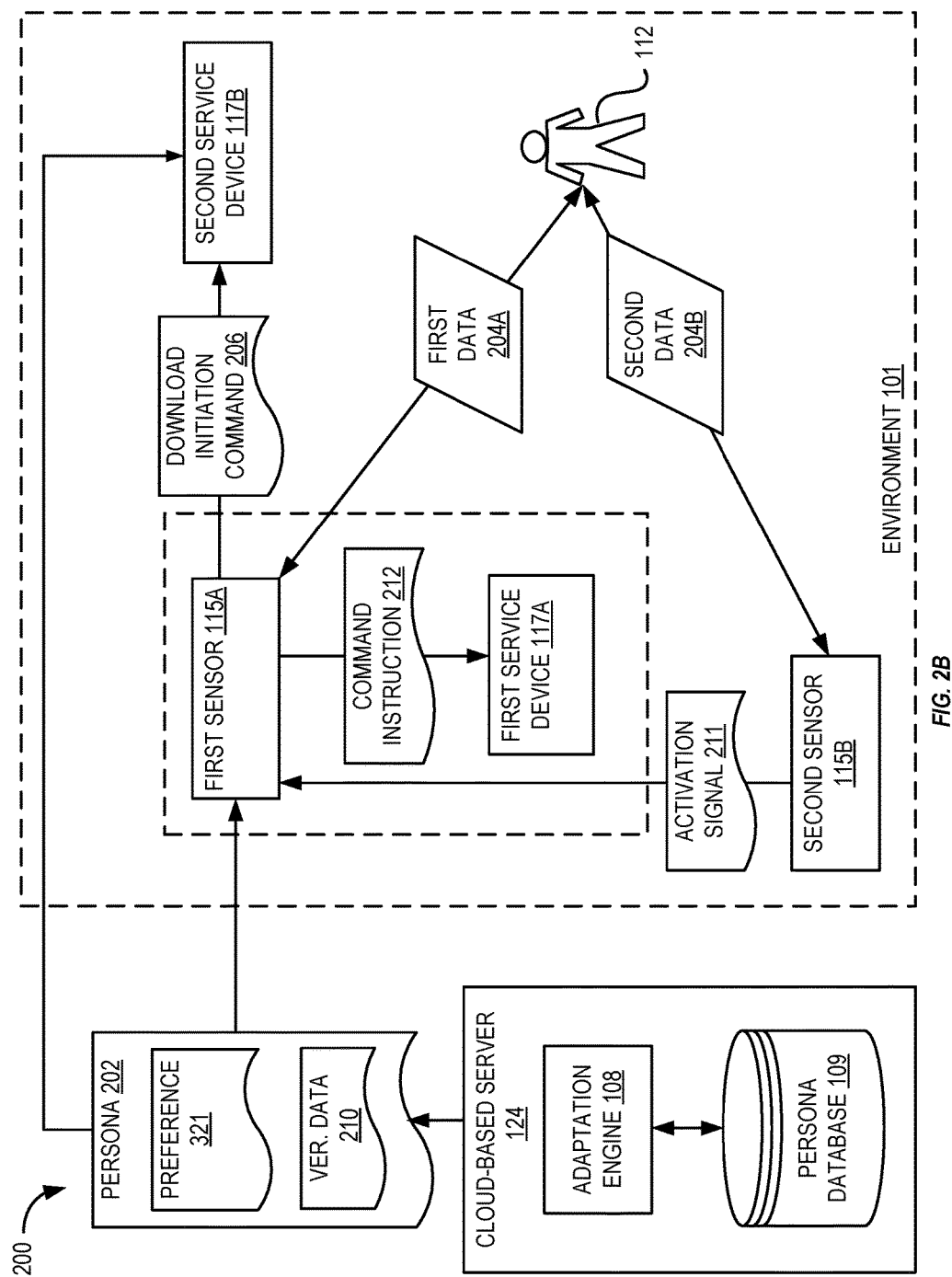
FIG. 2B is a block diagram of an example service delivery process that may be performed in the service delivery system of FIG. 1.

FIG. 2B is a block diagram of an example service delivery process 200 that may be performed in the service delivery system 100 of FIG. 1. The service delivery process 200 of FIG. 2B may be used to dynamically adapt the environment 101 based on the persona 202 of the user 112. FIG. 2B includes the cloud-based server 124, the adaptation engine 108, the persona database 109, the first sensor 115A, the second sensor 115B, the first service device 117A, the user 112, the environment 101, and the second service device 117B described in FIG. 1. Although not shown in FIG. 2B, communication of the persona 202, the download initiation command 206, first and second data 204A and 204B, an activation signal 211, the command instruction 212, or some combination thereof in the service delivery process 200 may be via a network such as the network 122 of FIG. 1.

In the service delivery process 200 of FIG. 2B, the first sensor 115A, may monitor the environment 101. The first sensor 115A may collect first data 204A. The first data 204A may include a user characteristic of the user 112 in the environment 101. For example, the first data 204A may include a vein image, an image of a face, or a fingerprint of the user 112. The first sensor 115A may download the persona 202. For instance, the first sensor 115A may download the persona 202 from the cloud-based server 124 via a network.

Additionally or alternatively, the adaptation engine 108 may access the persona 202 from the persona database 109. The adaptation engine 108 may then communicate or enable download of the persona 202.

The persona 202 may be specific to the user 112 as described with reference to FIG. 2A. The persona 202 may be one of multiple personas that are stored on the cloud-based server 124. The first data 204A may be used by the adaptation engine 108 to determine which of the multiple personas on the persona database 109 is specific to the user 112.

The persona 202 may include a preference 321 that is specific to the user 112. The preference 321 may be related to a command instruction 212. The command instruction 212 may be configured to modify a physical operational condition of the first service device 117A in the environment 101. Modification of the physical operational condition may occur upon receipt of the command instruction 212 by the first service device 117A. The modification may be consistent with the preference 321.

In the depicted embodiment, the command instruction 212 may be included in the persona 202. In other embodiments, the first sensor 115A may generate the command instruction 212 and communicate the command instruction 212 to the first service device 117A.

In some embodiments, the first sensor 115A may be separate from the first service device 117A. In these embodiments, the command instruction 212 may be communicated via the network (e.g., the network 122). In other embodiments, the first sensor 115A may be integrated with the first service device 117A. In these embodiments, the command instruction 212 may be communicated directly via a wired or electrical system.

Additionally or alternatively, the first sensor 115A may receive the persona 202. In response, the first sensor 115A may communicate a download initiation command 206 to a second service device 117B. The download initiation command 206 may be configured to prompt the second service device 117B to download the persona 202 from the cloud-based server 124.

Based on the persona 202, the second service device 117B may modify a physical operational condition of the second service device 117B in the environment 101. Modification of the physical operational condition may occur upon receipt of the persona 202 by the second service device 117B. The modification may be consistent with the preference 321. In some embodiments, a command instruction (e.g., the command instruction 212) may be included in the persona 202, which may be downloaded by the second service device 117B.

In some embodiments, the persona 202 may include verification data 210 (in the Figures "ver. data 210"). In these and other embodiments, prior to modification of the physical operation condition (e.g., by the first service device 117A or the second service device 117B), the first sensor 115A may confirm that the first data 204A is sampled from the user 112 based on the verification data 210. For example, the verification data 210 may include a facial recognition image, a vein print, a finger print, and the like. The first data 204A may be compared to the verification data 210 to confirm that the user 112 is the source of the first data 204A. Additionally, in these and other embodiments, following confirmation the download initiation command 206 and/or the command instruction 212 may be communicated from the first sensor 115A.

In some embodiments, the second sensor 115B may receive second data 204B. The second data 204B may include a passive type of data. For example, the second sensor 115B may include a motion sensor and the second data 204B may include data representative of a motion of the user 112 in proximity of the second sensor 115B. In response to the second data 204B, an activation signal 211 may be communicated from the second sensor 115B to the first sensor 115A. The activation signal 211 may be configured to activate a monitoring function of the first sensor 115A and indicating that the second sensor 115B sensed the presence of the user 112 in the environment 101.

Figure 2C:
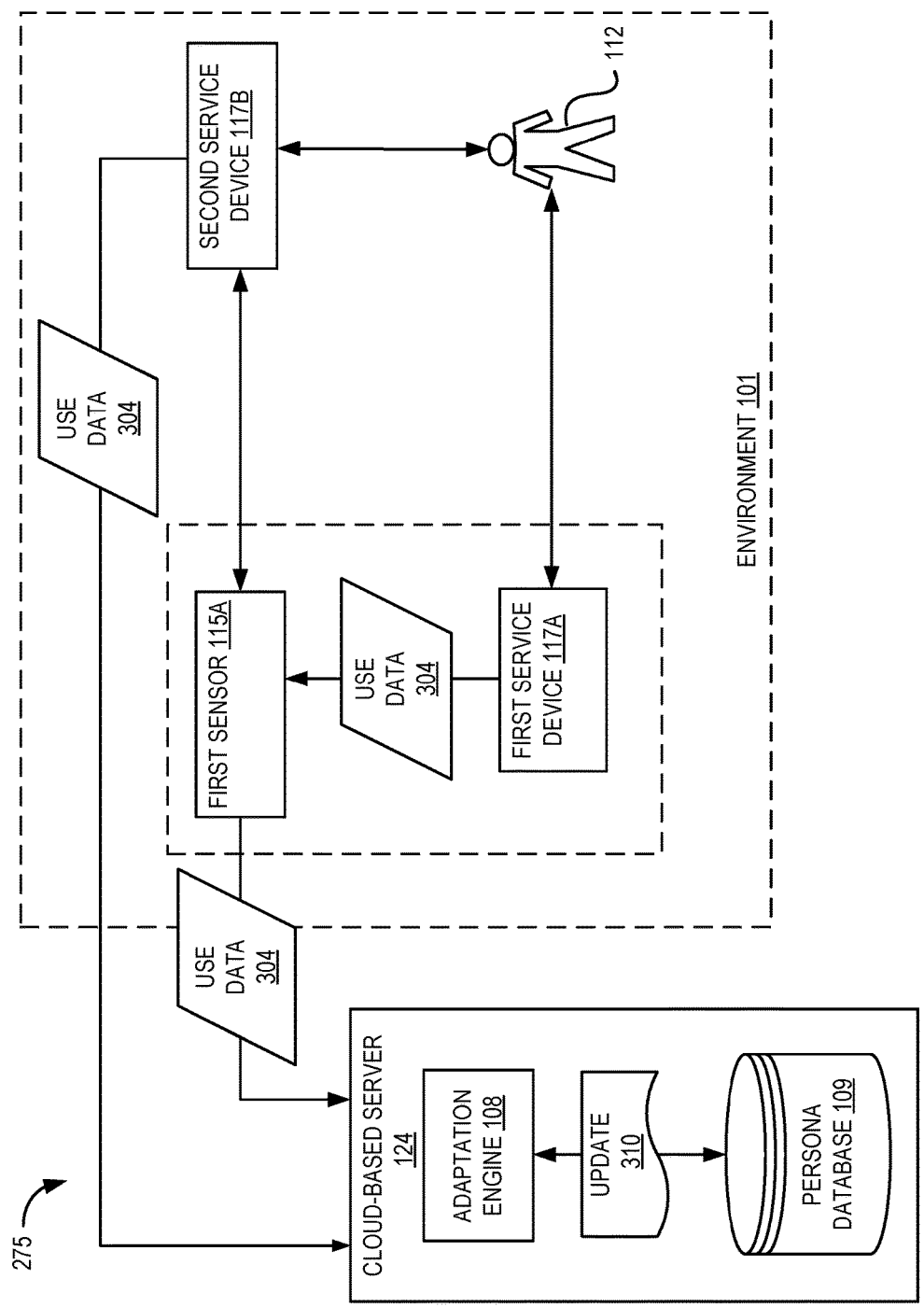
FIG. 2C is a block diagram of an example update process that may be performed in the service delivery system 100 of FIG. 1.

FIG. 2C is a block diagram of an example update process 275 that may be performed in the service delivery system 100 of FIG. 1. The update process 275 of FIG. 2C may be used to dynamically update the persona database 109 or one or more personas stored on the persona database 109. Using the update process 275, the personas in the persona database 109 may dynamically adapt to behaviors of the user 112 and interactions of the user 112 with the service devices 117 and the sensors 115. Accordingly, as preferences of the user 112 change, the persona (e.g., the persona 202 of FIGS. 2A and 2B) for the user 112 may be updated to reflect that change.

FIG. 2C includes the cloud-based server 124, the adaptation engine 108, the persona database 109, the first sensor 115A, the first service device 117A, the user 112, the environment 101, and the second service device 117B described in FIG. 1. Although not shown in FIG. 2C, communication of the use data 304 in the update process 275 may be via a network such as the network 122 of FIG. 1.

The update process 275 may be based on one or more of the first service device 117A, the first sensor 115A, and second service device 117B, continuing to monitor the environment 101 following development of the persona 202 in FIG. 2A. For example, while the particular user 112 interacts with the first service device 117A, the first sensor 115A, and second service device 117B, the use data 304 may continue to be generated. The use data 304 of FIG. 2C is substantially similar to the use data of FIG. 2A. The first service device 117A, the first sensor 115A, and second service device 117B may extract the use data 304 and transmit the use data 304 to the cloud-based server 124.

The use data 304 in FIG. 2C may be indicative of a change to a preference of the user 112. For example, during a given period of time, the user 112 may have a thermostat set to 77 degrees Fahrenheit. The persona (e.g., 202 of FIG. 2A) for the user 112 may include a preference of a thermostat setting at 77 degrees. The user 112 may then start using the thermostat at 68 degrees Fahrenheit. Based on the use of the thermostat at 68 degrees, the thermostat may generate use data 304 that indicates the use at 68 degrees.

At the cloud-based server 124, the persona database 109 may be dynamically adapted based on the use data 304. For example, the adaptation engine 108 may generate an update 310 based on the use data 304. The update 310 may be communicated to the persona database 109. The update 310 may change one or more of the preferences, the validation data, and the command instruction for one or more environments (e.g., the environment 101). For example, the update may create an adapted persona that may include a modified preference and/or an altered command instruction consistent with the modified preference. The update 310 may accordingly dynamically adapt the persona (e.g., 202 of FIG. 2A) of the user 112 stored in the persona database 109 based on interaction of the user 112 with the service devices 117A and 117B and/or the sensor 115A.

Continuing from the above example, the adaptation engine 108 may generate the update 310 based on the use data 304 indicative of the use of the thermostat at 68 degrees. The preference that the user 112 sets the thermostat to 77 degrees may be changed based on the update 310.

Figure 3:
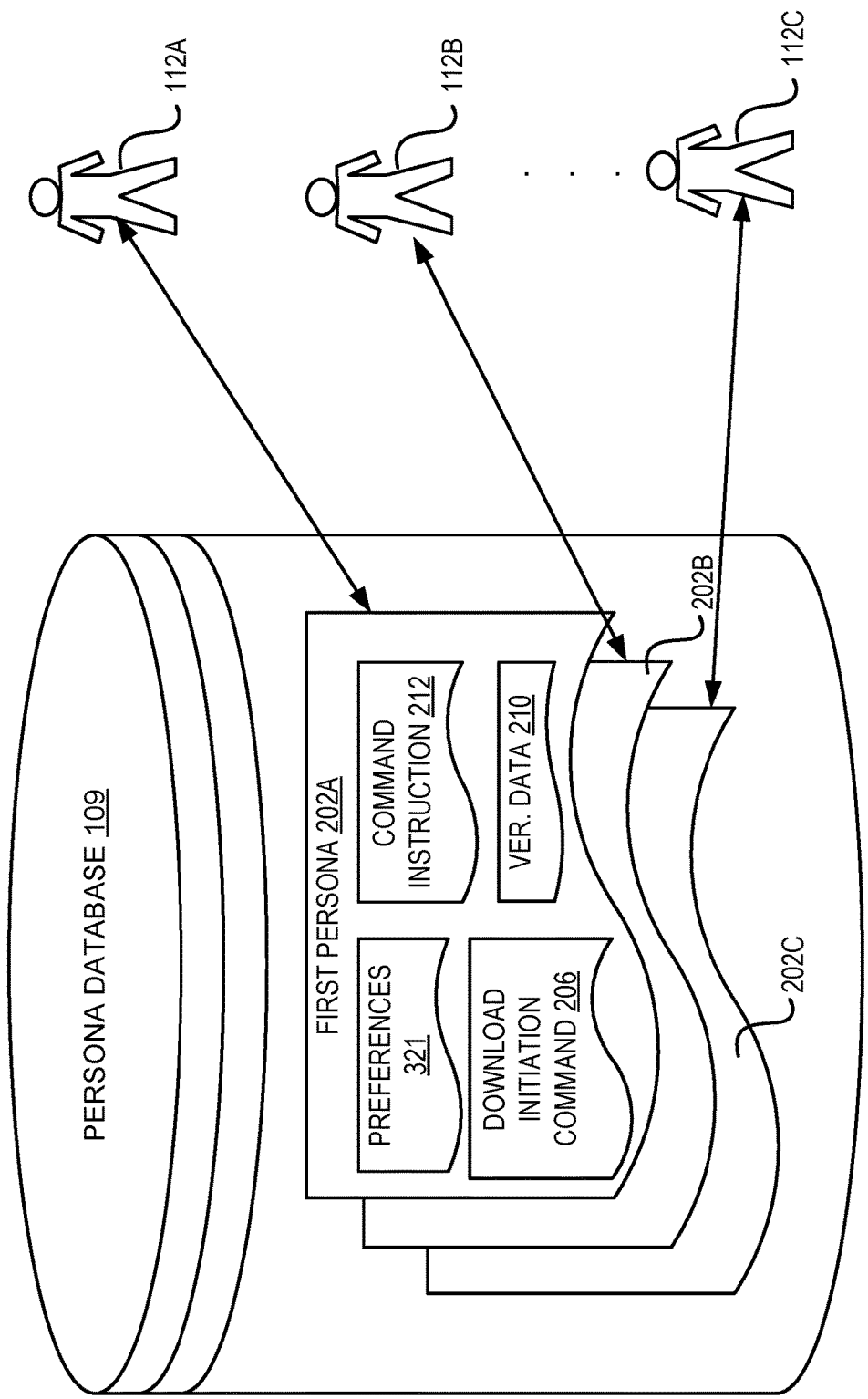
FIG. 3 is a block diagram of an example embodiment of a persona database of the service delivery system of FIG. 1.

FIG. 3 is a block diagram of an example embodiment of the persona database 109 of FIGS. 1-2C. The persona database 109 may include multiple personas 202A-202C. One or more of the personas 202A-202C may be specifically configured for a particular user of a set of users 112A-112C. For example, in FIG. 3 the persona database 109 includes three personas 202A-202C and three users 112A-112C. One of the personas 202A-202C is specific to one of the users 112A-112C. In other embodiments, one or more of the personas 202A-202C may be specific to a group of the users 112A-112C. For instance, one of the personas 202A-202C may be specific to a family or a work group.

The personas 202A-202C may include one or more preferences 321. The preferences 321 may be specific to a particular user of the set of users 112A-112C. The preferences 321 may include any particularity or inclination of the particular user. The preferences 321 may be based on use data that is received from a sensor that monitors a current environment and from a service device that is located in the current environment while the particular user interacts with the service device in the current environment. The preference reflects the interaction by the particular user with the service device as monitored by the sensor. In addition, the preferences 321 may include information input to the cloud-based server. For instance, an administrator may input information used in one of the preferences 321.

Some examples of the preferences 321 may include coffee strength, snacks, food, lighting brightness, room temperature, ambient conditions, bed times, art, movies, music, recipes, wake-up time, a health record, a medication history, an allergy, PCP information, lab tests and appointments, a preferred specialist, computer access, a payment method, a coupon, a shopping list, a buying pattern, a brand preference, a productivity tool setting, a temperature, a lighting setting, a conference room configuration preference, a calendar, an entertainment device setting, an entertainment preference, and the like.

The personas 202A-202C may include a command instruction 212. The command instruction may be based on one or more of the preferences 321. The command instruction 212 may be configured to modify a physical operational condition of a service device consistent with the one or more preferences 321 upon receipt of the command instruction. For example, the command instruction 212 may be configured to modify a physical operational condition of a service device in a current environment upon receipt of the command instruction. The command instruction 212 may be consistent with one or more of the preferences 321. For instance, the preferences 321 may include a wake-up time. Consistent with the wake-up time, the command instruction 212 may include instructions that are communicated to an alarm that set the alarm for the wake-up time. Additional examples of the command instructions 212 may include setting a music station, selecting a television show, modifying a lighting system, modifying an HVAC system, opening a door, deploying a service robot, changing a digital image, changing a setting on a microwave, changing a setting on a coffee maker, positioning a set of drapes, etc. Some additional examples of preferences 321 and command instructions 212 are provided elsewhere in this disclosure.

The personas 202A-202C may include verification data 210. The verification data 210 may include any characteristic of one of the users 112A-112C that may be used to verify that an unknown user is a particular user. For example, the verification data 210 may include a fingerprint, palm vein image, retinal information, facial scan, password (auditory/spoken or keyed in), and the like. Collected data from one of the users 112A-112C may be checked against the verification data 210. For example, prior to modification of a physical operational condition based on one of the persona 202A-202C, the collected data that is sampled from the user may be checked against the verification data 210.

The personas 202A-202C may include a download initiation command 206. The download initiation command 206 may be configured to initiate download of the persona by a service device. For example, a first persona 202A may be downloaded by a sensor. The persona may include the download initiation command 206, which may be communicated to a service device in the current environment. Upon receipt of the download initiation command 206, the service device may download the first persona 202A.

As described elsewhere in this disclosure, the preferences 321, the command instruction 212, the verification data 210, the download initiation command 206, or some combination thereof may be updated and/or modified based on additional use data.

The embodiment of the persona database 109 of FIG. 3 includes one database in which three personas 202A-202C are stored. In other embodiments, the persona database 109 may store more than three personas 202A-202C. For instance, the persona database 109 may store thousands of personas 202A-202C. Additionally or alternatively, subsets of the personas 202A-202C may be stored on two or more databases.

Figure 4:
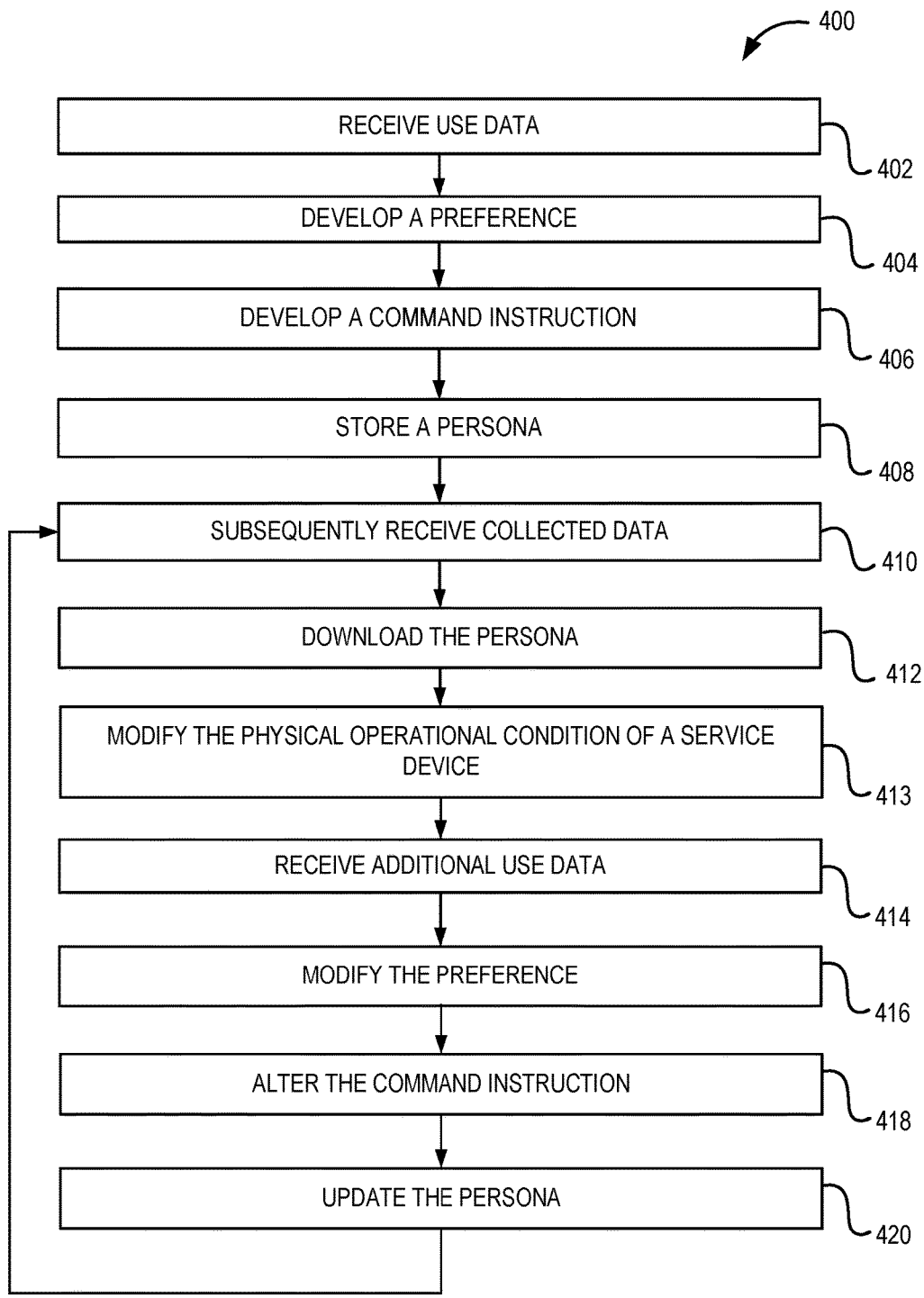
FIG. 4 is a flow chart of an example method of persona-based service delivery.

FIG. 4 is a flow chart of an example method 400 of persona-based service delivery, in accordance with at least one embodiment described in this disclosure. The method 400 may be performed in an operating environment such as the service delivery system 100 of FIG. 1. The method 400 may be programmably performed in some embodiments by the adaptation engine 108 described with reference to FIG. 1. In some embodiments, the adaptation engine 108 or another computing system may include or may be communicatively coupled to a non-transitory computer-readable medium (e.g., the memory 1208 of FIG. 12) having stored thereon programming code or instructions that are executable by one or more processors (such as the processor 1204 of FIG. 12) to cause a computing system and/or the adaptation engine 108 to perform or control performance of the method 400. Additionally or alternatively, the adaptation engine 108 may include the processor 1204 described elsewhere in this disclosure that is configured to execute computer instructions to cause the adaptation engine 108 or another computing system to perform or control performance of the method 400. Although illustrated as discrete blocks, various blocks in FIG. 4 may be divided into additional blocks, combined into fewer blocks, or eliminated, depending on the desired implementation.

The method 400 may begin at block 402 in which use data may be received. The use data may be received by a cloud-based server such as the cloud-based server 124 of FIG. 1. The use data may be received from a sensor that monitors a current environment and/or from a service device that is located in the current environment while a particular user interacts with the service device in the current environment. In some embodiments, the current environment includes a vehicle, a clinical environment, a work environment, a shopping environment, a residential environment, or another suitable environment. The service device may include a home entry device, garage door opener, vehicle keyless ignition, a vehicle interior component configuration, navigation settings, a heating ventilation and air conditioning (HVAC) device, a refrigerator, a coffee maker, a washing machine, a light, a lighting control device, a keyless ignition, a vehicle operator entertainment device, a navigation device, a vehicle HVAC device, a computing device, a conference room device, a thermostat, and a productivity tool. Additionally in some embodiments, the sensor and the service device are integrated into a single device.

At block 404, a preference may be developed. The preference may be developed by the cloud-based server and may be based on the use data. The preference may be developed for the particular user and may reflect the interaction by the particular user with the service device as monitored by the sensor. In addition, in some embodiments, the preference is further configured for the particular user in one or more other environments that are the same type of environment as the current environment and for one or more other service devices that are the same type of device as the service device in the current environment. Some examples of the preference include a health record, a medication history, an allergy, PCP information, lab tests and appointments, a preferred specialist, computer access, a payment method, a coupon, a shopping list, a buying pattern, a brand preference, a productivity tool setting, a temperature, a lighting setting, a conference room configuration preference, an entertainment device setting, and an entertainment preference.

At block 406, a command instruction may be developed. The command instruction may be based on the preference. The command instruction may be developed by the cloud-based server. The command instruction may be configured to modify a physical operational condition of the service device consistent with the preference upon receipt of the command instruction.

At block 408 a persona may be stored. The persona may be stored by the cloud-based server in a persona database. The persona may be specific to the particular user. The persona may include the preference and the command instruction for the particular user in the current environment.

At block 410, collected data may be subsequently received. The collected data may be subsequently received by the cloud-based server. The collected data may include a user characteristic of the particular user in the current environment from the sensor in the current environment.

At block 412, the persona may be downloaded to the sensor. The persona may include the preference and the command instruction. The persona may be downloaded in response to receipt of the collected data. The downloading may occur in real time or substantially real time upon receipt of the collected data. At block 413, the physical operational condition of the service device may be modified. The physical operational condition of the service device may be modified based on the command instruction of the persona.

Figure 5:
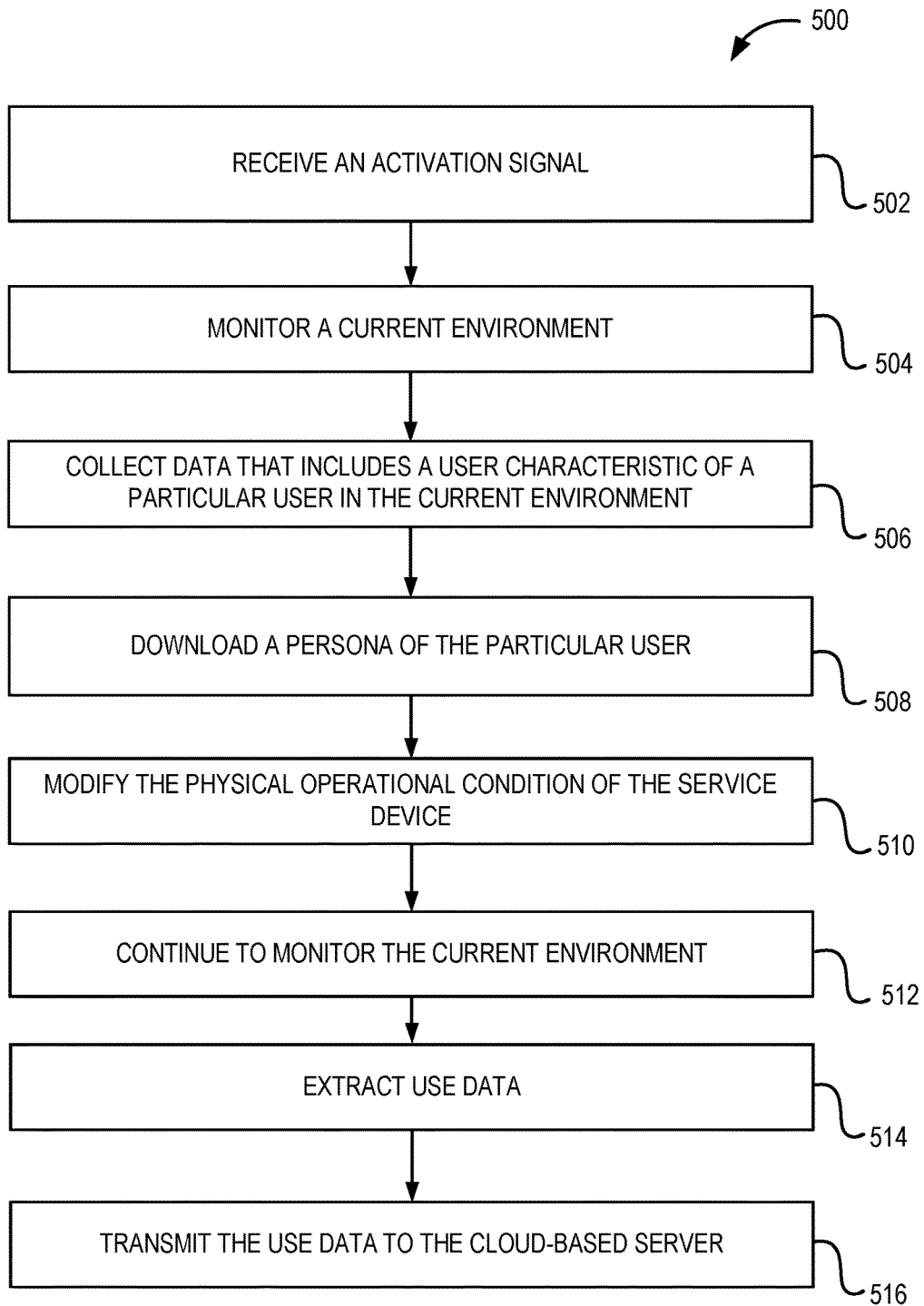
FIG. 5 is a flow chart of another example method of persona-based service delivery.

FIG. 5 is a flow chart of another example method 500 of persona-based service delivery in accordance with at least one embodiment of this disclosure. The method 500 may be performed in an operating environment such as the service delivery system 100 of FIG. 1. The method 500 may be programmably performed in some embodiments by the adaptation engine 108, the adaptation module 111, the service device 117, or the sensor 115 described with reference to FIG. 1.

In some embodiments, the adaptation engine 108, the adaptation module 111, the service device 117, the sensor 115 or another computing system may include or may be communicatively coupled to a non-transitory computer-readable medium (e.g., the memory 1208 of FIG. 12) having stored thereon programming code or instructions that are executable by one or more processors (such as the processor 1204 of FIG. 12) to cause performance or control performance of the method 500. Additionally or alternatively, the adaptation engine 108, the adaptation module 111, the service device 117, the sensor 115 or the computing system may include the processor 1204 described elsewhere in this disclosure that is configured to execute computer instructions to cause performance or control performance of the method 500. Although illustrated as discrete blocks, various blocks in FIG. 5 may be divided into additional blocks, combined into fewer blocks, or eliminated, depending on the desired implementation.

The method 500 may begin at block 502, in which an activation signal may be received. For example, the activation signal may be received from a second sensor. The activation signal may be configured to activate a monitoring function of a first sensor. The activation signal may indicate that the second sensor sensed the presence of the particular user in the current environment.

At block 504, a current environment may be monitored. For example, the current environment may be monitored by the first sensor. The current environment may include a vehicle, a clinical environment, a work environment, a shopping environment, a residential environment, or another suitable environment. At block 506, data may be collected. The data may be collected by the first sensor. The data may include a user characteristic of a particular user in the current environment.

At block 508, a persona may be downloaded. The persona may be downloaded by the first sensor. The persona of the particular user may be stored on a cloud-based server such as the cloud-based server 124 of FIG. 1. The persona may include a preference that specific to the particular user and a command instruction configured to modify a physical operational condition of a service device in the current environment upon receipt of the command instruction consistent with the preference.

Some examples of the service device include a home entry device, garage door opener, vehicle keyless ignition, a vehicle interior component configuration, navigation settings, a heating ventilation and air conditioning (HVAC) device, a refrigerator, a coffee maker, a washing machine, a light, a lighting control device, a keyless ignition, a vehicle operator entertainment device, a navigation device, a vehicle HVAC device, a computing device, a conference room device, a thermostat, and a productivity tool. The preference may include a health record, a medication history, an allergy, PCP information, lab tests and appointments, a preferred specialist, computer access, a payment method, a coupon, a shopping list, a buying pattern, a brand preference, a productivity tool setting, a temperature, a lighting setting, a conference room configuration preference, an entertainment device setting, and an entertainment preference.

At block 510, the physical operational condition of the service device may be modified based on the command instruction of the persona. At block 512, the current environment may be monitored while the particular user interacts with the service device. At block 514, use data may be extracted regarding physical operational conditions of the service device during use by the particular user. At block 516, the use data may be transmitted to the cloud-based server for dynamic adaptation of the persona.

In some embodiments, the persona further includes verification data. In these and other embodiments, the method 500 may include confirming prior to modifying the physical operational condition, by the first sensor, that the collected data is sampled from the particular user based on the verification data. Following confirmation, the method 500 may communicate a download initiation command to one or more smart appliances, wherein the download initiation command is configured to initiate download by the one or more smart appliances of the persona.

In some embodiments, the first sensor and the service device are integrated into a single device. In some embodiments, the first sensor is separate from the service device. In embodiments in which the first sensor is separate from the service device, the method may include communicating, by the first sensor, the command instruction to the service device.

Figure 6:
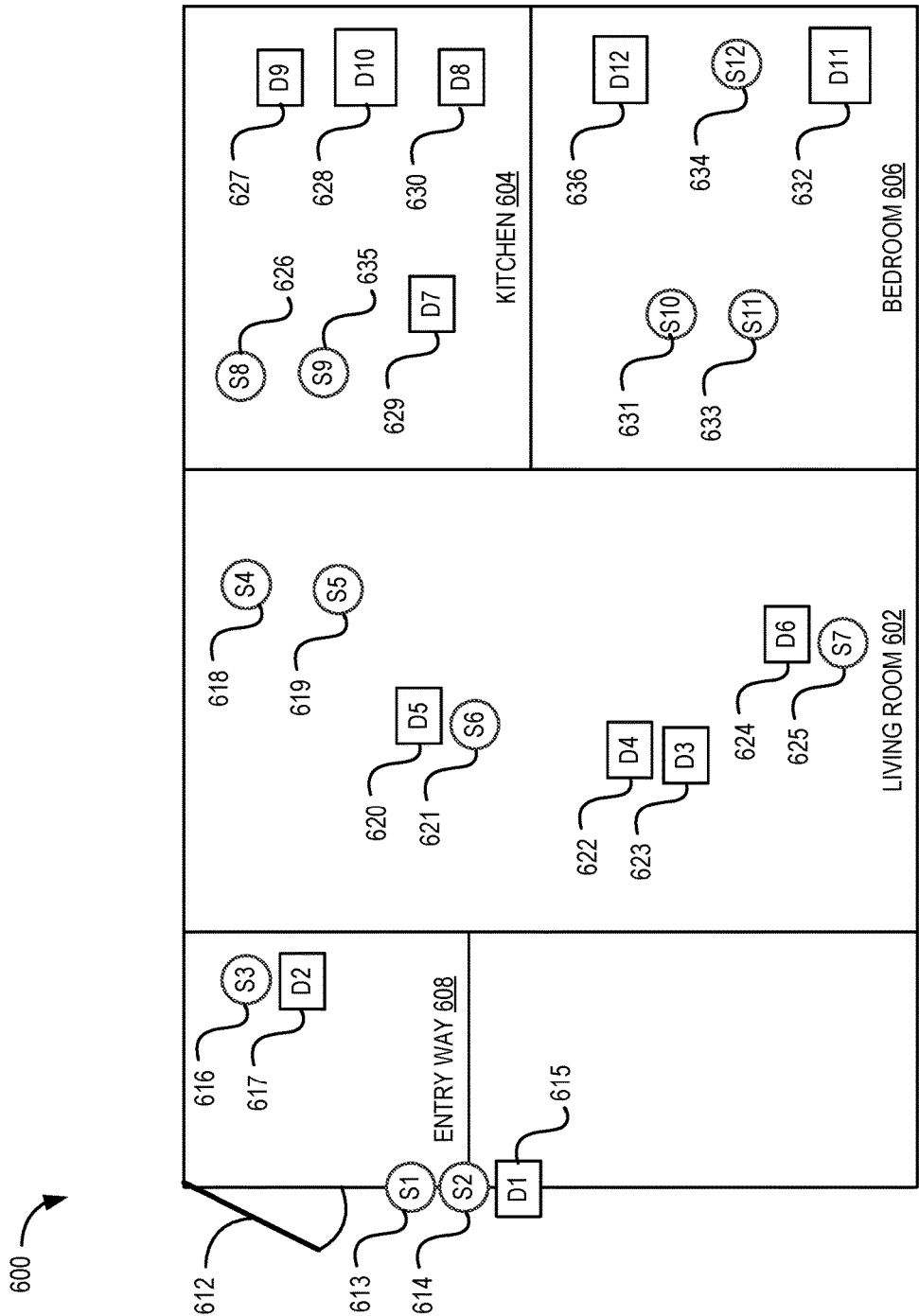
FIG. 6 is a block diagram of an example embodiment of an environment of the service delivery system.

FIG. 6 is a block diagram of an example house 600. The house 600 is an example of the environment 101 described in this disclosure. Persona-based service delivery may be implemented in multiple rooms 602, 604, 606, 608, and at a door 612 of the house 600. The house 600 may include multiple service devices D1-D12, which may be substantially similar to the service device 117 described elsewhere in this disclosure. The house 600 may include multiple sensors S1-S12, which may be substantially similar to the sensor 115 described elsewhere in this disclosure. One or more of the service devices D1-D12 and/or the sensors S1-S12 may be communicatively coupled with a cloud-based server such as the cloud-based server 124 of FIG. 1 (e.g., via network 122 of FIG. 1). One or more of the service devices D1-D12 and/or the sensors S1-S12 may additionally be communicatively coupled to one another or some subset thereof (e.g., via network 122 of FIG. 1).

The one or more of the service devices D1-D12 and/or the sensors S1-S12 may access or download the persona and/or the preferences from the cloud-based server. The persona and/or the preferences may be communicated between the service devices D1-D12 and/or the sensors S1-S12. The persona and/or preferences may be used to adapt the house 600. For instance, methods 700-1100 describe some example persona-based service delivery that may occur in the house 600. The methods 700-1100 represent example persona-based service delivery processes. Other persona-based service delivery processes may be performed in the house 600 and other persona-based service delivery processes may be performed in other environments as described elsewhere in this disclosure.

Figure 7:
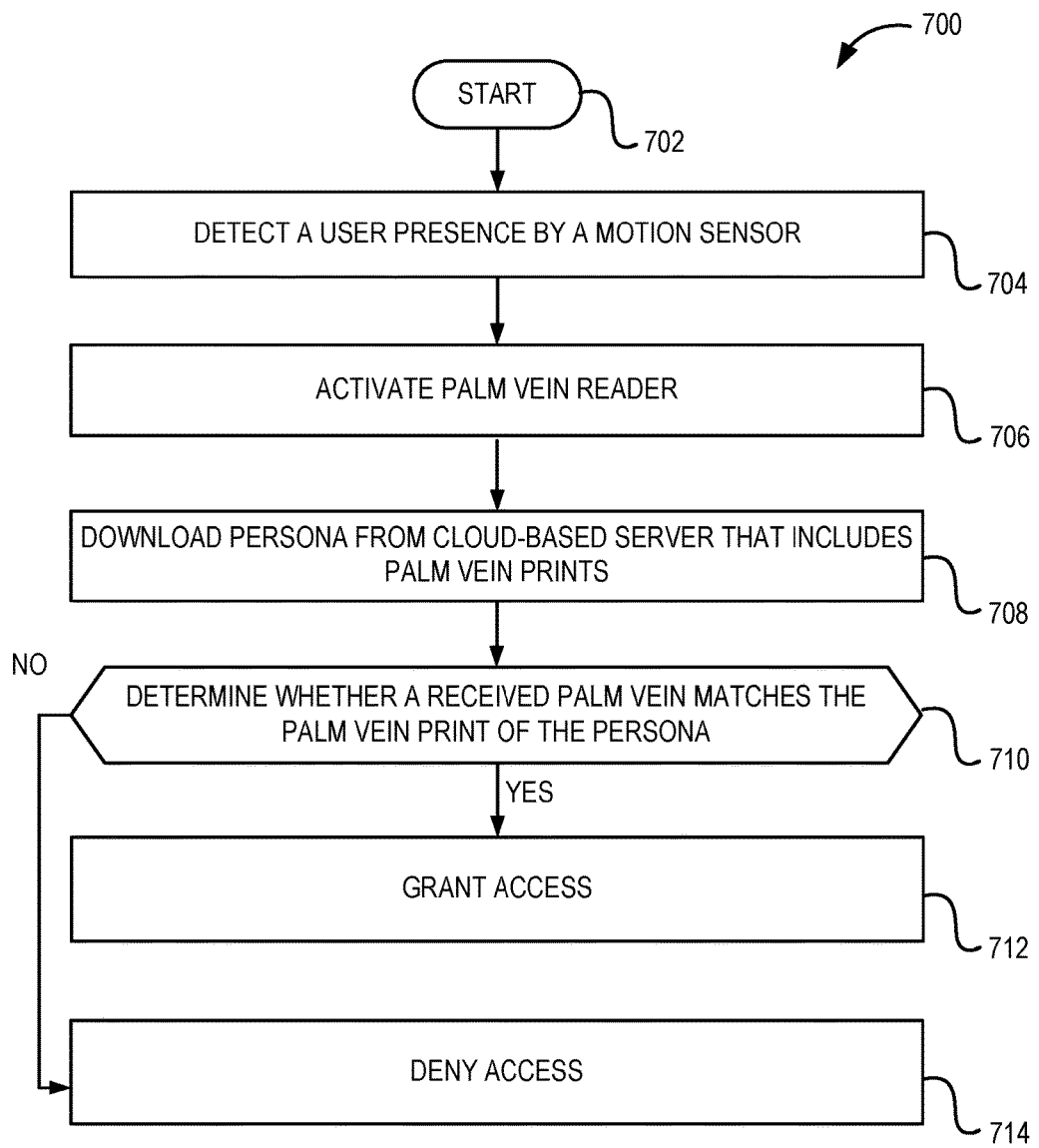
FIG. 7 is a flow chart of another example method of persona-based service delivery.

FIG. 7 is a flow chart of another example method 700 of persona-based service delivery that may be implemented at a front door 612 of the house 600 of FIG. 6, in accordance with at least one embodiment described in this disclosure. Although illustrated as discrete blocks, various blocks in FIG. 7 may be divided into additional blocks, combined into fewer blocks, or eliminated, depending on the desired implementation. The method 700 may be an example of the method 500 described elsewhere in this disclosure.

FIG. 7 is described with reference to the house 600 of FIG. 6. It may be understood with the benefit of this disclosure that the method 700 may be performed in other houses or any other suitable environment. For example, any door that includes a motion sensor, which is represented by (S1/613 in FIG. 6), a palm vein reader (S2/614 in FIG. 6), a locking mechanism (D1/615 of FIG. 6), some combination thereof, or one or more suitable alternatives.

The method 700 may begin at block 702. At block 704, a user presence may be detected by a motion sensor. For example, a presence of a user may be detected by the motion sensor 613 of FIG. 6. At block 706, a palm vein reader may be activated. For example, the palm vein reader may be activated in response to detection of the user by the motion sensor. In some embodiments, the palm vein reader 614 of FIG. 6 may be activated.

At block 708, a persona may be downloaded. The persona may be downloaded from a cloud-based server that includes palm vein prints. For example, the persona may be downloaded from the cloud-based server 124 of FIG. 1. In some embodiments, the palm vein reader 614 of FIG. 6 may download the persona that includes the palm vein prints.

At block 710, it may be determined whether a received palm vein matches the palm vein print that is downloaded from the cloud-based server. The palm vein may be received from the user. For example, the palm vein reader 614 of FIG. 6 may receive the palm vein from the user. The palm vein reader 614 may then determine whether the received palm vein matches the downloaded palm vein print.

In response to the received palm vein matching the downloaded palm vein print ("YES" at block 710), the method 700 may proceed to block 712. At block 712, access may be granted. For example, access may be granted by the locking mechanism 615 of FIG. 6. For example, the locking mechanism 615 may unlock the door 612. In response to the received palm vein not matching the downloaded palm vein print ("NO" at block 710), the method 700 may proceed to block 714. At block 714, access may be denied. For example, access may be denied by the locking mechanism 615 of FIG. 6. For example, the locking mechanism 615 may lock the door 612.

Figure 8:
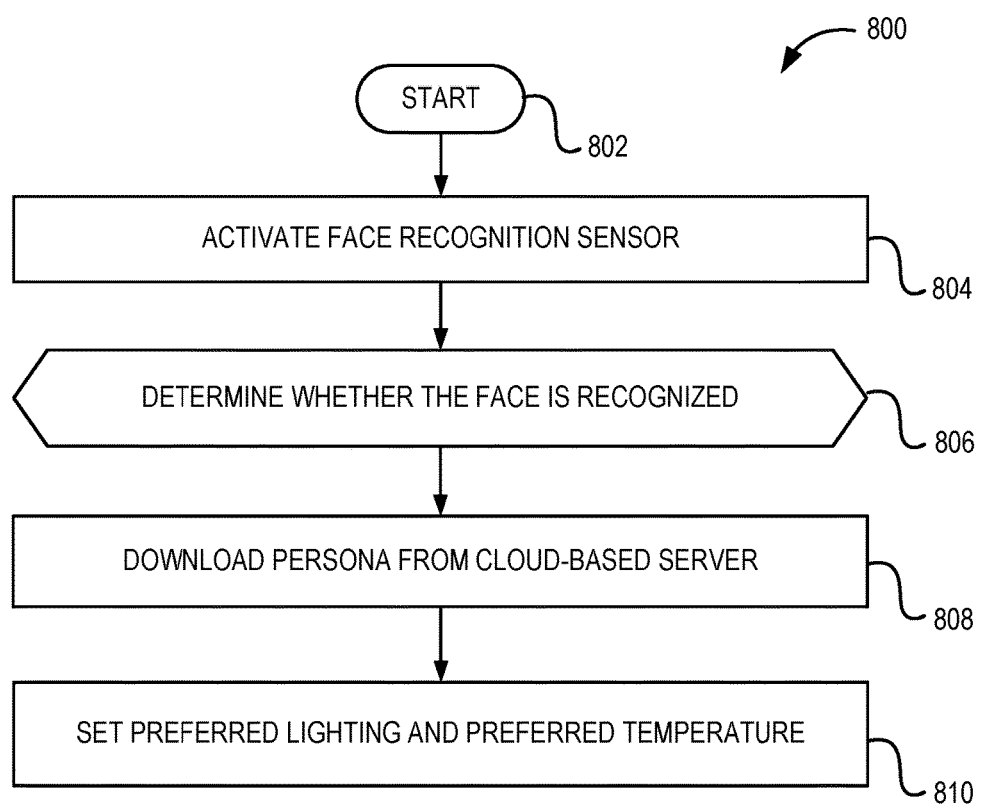
FIG. 8 is a flow chart of another example method of persona-based service delivery.

FIG. 8 is a flow chart of another example method 800 of persona-based service delivery that may be implemented at an entry way 608 of the house 600 of FIG. 6, in accordance with at least one embodiment described in this disclosure. Although illustrated as discrete blocks, various blocks in FIG. 8 may be divided into additional blocks, combined into fewer blocks, or eliminated, depending on the desired implementation. The method 800 may be an example of the method 500 described elsewhere in this disclosure.

FIG. 8 is described with reference to the house 600 of FIG. 6. It may be understood with the benefit of this disclosure that the method 800 may be performed in other houses or any other suitable environment. For example, any room that includes a facial recognition sensor, which is represented by (S3/616 in FIG. 6) and a lighting/temperature control mechanism (D2/617 in FIG. 6) some combination thereof, or one or more suitable alternatives.

The method 800 may begin at block 802. At block 804, a facial recognition sensor may be activated. For example, following entry of the user through the door 612, the facial recognition sensor 616 may be activated. At block 806, it may be determined whether a face is recognized. For example, it may be determined whether the user who entered the entry way 608 is a particular user who is associated with a particular persona.

At block 808, a persona may be downloaded. For example, a persona may be downloaded from a cloud-based server such as the cloud-based server 124 of FIG. 1. In FIG. 6, the facial recognition sensor 616 and/or the lighting/temperature control mechanism 617 may download the persona from the cloud-based server 124.

At block 810, preferred lighting and preferred temperature may be set. The preferred lighting and the preferred temperature may be included in the persona. For example, the user may like a temperature range of about 65 degrees Fahrenheit to about 78 degrees Fahrenheit. Accordingly, the lighting/temperature control mechanism 617, which may include a thermostatic device, may modify a temperature setting of the thermostatic device to be within the range of about 65 degrees Fahrenheit to about 78 degrees Fahrenheit. Similarly, the persona may include a brightness or color preference. Accordingly, the lighting/temperature control mechanism 617 may include a dimmer switch and may modify a dimmer setting of the dimmer switch.

Figure 9:
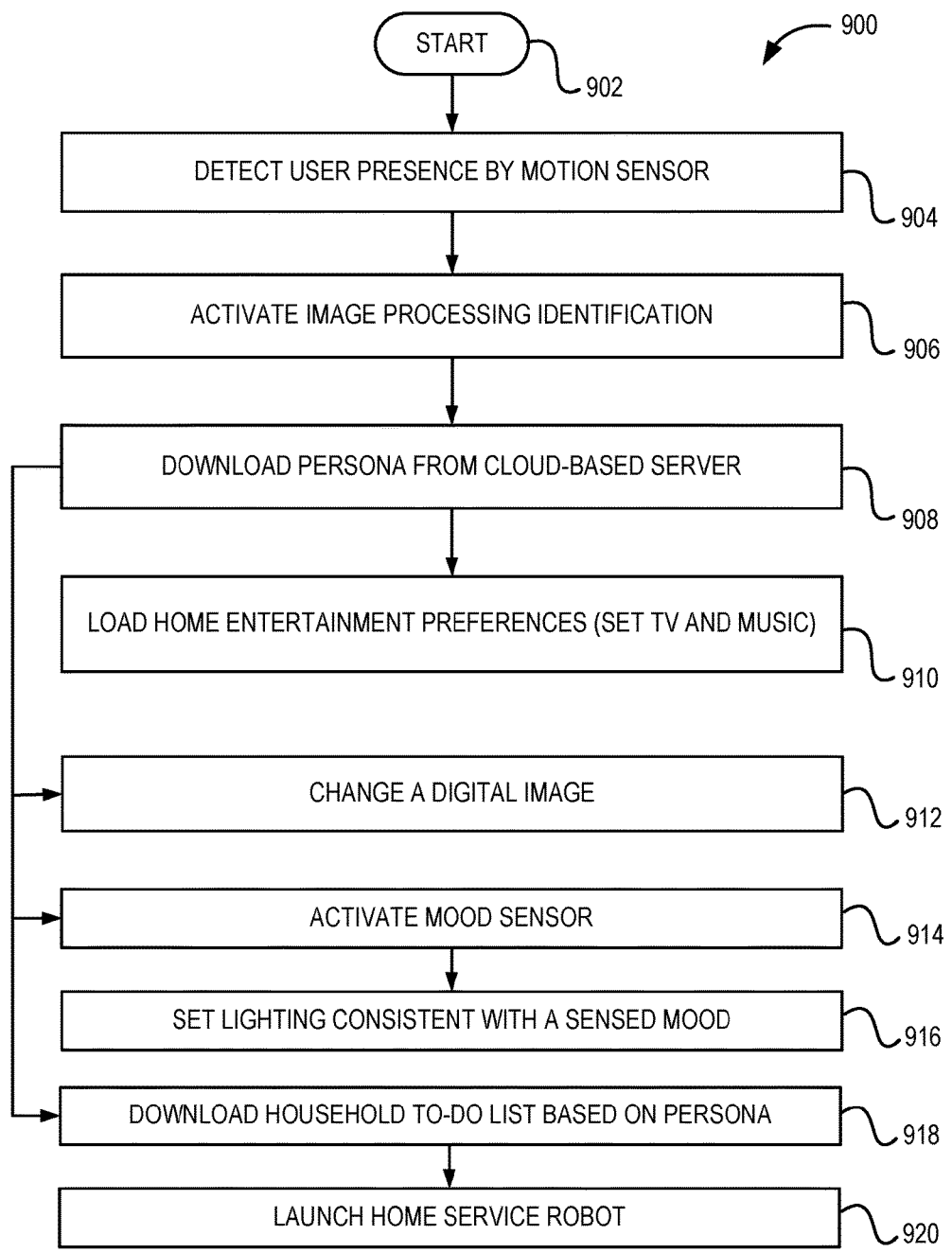
FIG. 9 is a flow chart of another example method of persona-based service delivery.

FIG. 9 is a flow chart of another example method 900 of persona-based service delivery that may be implemented in a living room 602 of the house 600 of FIG. 6, in accordance with at least one embodiment described in this disclosure. Although illustrated as discrete blocks, various blocks in FIG. 9 may be divided into additional blocks, combined into fewer blocks, or eliminated, depending on the desired implementation. The method 900 may be an example of the method 500 described elsewhere in this disclosure. FIG. 9 is described with reference to the house 600 of FIG. 6. It may be understood with the benefit of this disclosure that the method 900 may be performed in other houses or any other suitable environment.

For example, any room that includes a motion sensor, which is represented by (S4/618 of FIG. 6), an image processing identification sensor (S5/619 of FIG. 6), a service robot (D5/620 of FIG. 6), a household list sensor (S6/621 of FIG. 6), a home entertainment device (D4/622 of FIG. 6), a digital picture (D3/623 of FIG. 6), a lighting control device (D6/624 of FIG. 6), a mood sensor (S7/625 of FIG. 6), some combination thereof, or one or more suitable alternatives.

The method 900 may begin at block 902. At block 904, a user presence may be detected by a motion sensor. For example, the motion sensor 618 of FIG. 6 may detect the presence of the user. At block 906, an image processing identification sensor may be activated. In some embodiments, the image processing identification sensor may be activated in response to detection of the user by the motion sensor. For example, the image processing identification sensor 619 may be activated in response to the motion sensor 618 detecting the user.

At block 908, a persona may be downloaded. The persona may be downloaded from a cloud-based server such as the cloud-based server 124 of FIG. 1. The persona may be downloaded by one or more of the motion sensor 618 and the image processing identification sensor 619. The persona may be communicated to one or more other devices or sensors (e.g., D3-D6 and S6-S7).

At block 910, home entertainment preferences of the persona may be loaded. For example, the home entertainment preferences may be loaded to the home entertainment device 622. In some embodiments, the home entertainment device 622 may include a radio and the home entertainment preference may include a radio station; the home entertainment device 622 may include a digital music storage and the home entertainment preference may include a song or genre selection; the home entertainment device 622 may include a television or an online television or video on demand service and the home entertainment preference may include a program or a video; etc.

At block 912, a digital image may be changed. For example, the digital image of the digital picture 623 may be changed. For example, the digital picture 623 may display a digital image of an abstract piece of art. The preference of the persona may indicate that the user is not interested in abstract art. Accordingly, the digital image of the digital picture 623 may change to another piece of art.

At block 914, a mood sensor may be activated. For example, the mood sensor 625 may be activated. At block 916, lighting consistent with a sensed mood may be set. For example, the mood sensor 625 may communicate a mood to a lighting control device 624 (e.g., a dimmer switch). The lighting control device 624 may set lighting consistent with the communicated mood.

At block 918, a household to-do list of the persona may be downloaded. The household to-do list may be based on the persona that is downloaded from a cloud-based server such as the cloud-based server 124. For example, the household list sensor 621 may download the household to-do list from the cloud-based server 124 or from one or more other devices or sensors. At block 920, a home service robot may be launched. For example, the household to-do list may include vacuuming the living room 602. In response, the service robot 620, which may be capable of vacuuming, may be launched.

In the description of method 900, each of blocks 904, 906, 908, 910, 912, 914, 916, 918, and 920 are performed. In some embodiments, a subset of blocks 904, 906, 908, 910, 912, 914, 916, 918, and 920 may be performed.

Figure 10:
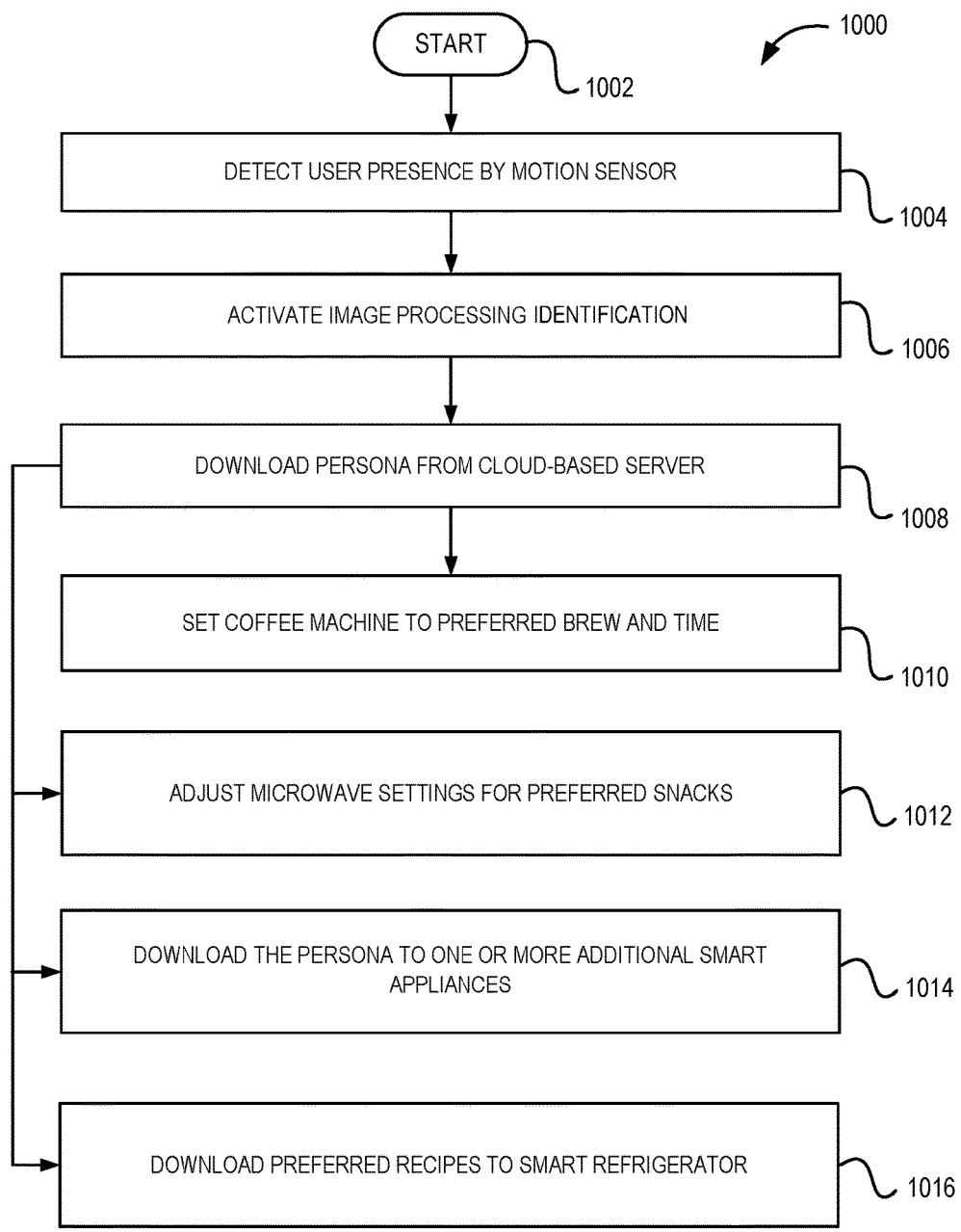
FIG. 10 is a flow chart of another example method of persona-based service delivery.

FIG. 10 is a flow chart of another example method 1000 of persona-based service delivery that may be implemented in at a kitchen 604 of the house 600 of FIG. 6, in accordance with at least one embodiment described in this disclosure. Although illustrated as discrete blocks, various blocks in FIG. 10 may be divided into additional blocks, combined into fewer blocks, or eliminated, depending on the desired implementation. The method 1000 may be an example of the method 500 described elsewhere in this disclosure.

FIG. 10 is described with reference to the house 600 of FIG. 6. It may be understood with the benefit of this disclosure that the method 1000 may be performed in other houses or any other suitable environment. For example, any room that includes a motion sensor (S8/626 of FIG. 6), an image processing identification sensor (S9/635 of FIG. 6), a smart appliance device (D7/629 of FIG. 6), a coffee machine (D9/627 of FIG. 6), a microwave (D10/628 of FIG. 6), a smart refrigerator (D8/630 of FIG. 6), some combination thereof, or one or more suitable alternatives.

The method 1000 may begin at block 1002. At block 1004, a user presence may be detected by a motion sensor. For example, the motion sensor 626 of FIG. 6 may detect the presence of the user. At block 1006, an image processing identification sensor may be activated. In some embodiments, the image processing identification sensor may be activated in response to detection of the user by the motion sensor. For example, the image processing identification sensor 635 may be activated in response to the motion sensor 626 detecting the user.

At block 1008, a persona may be downloaded. The persona may be downloaded from a cloud-based server such as the cloud-based server 124 of FIG. 1. The persona may be downloaded by one or more of the motion sensor 626 and the image processing identification sensor 635. The persona or a command instruction included therein may be communicated to one or more other devices or sensors (e.g., D7-D10 and S8-S9).

At block 1010, a coffee machine may be set to a preferred brew and brew time. For example, the coffee machine 627 may receive the persona and set a preferred brew (e.g., strong or weak) and a brew time (e.g., 6:00 AM). At block 1012, microwave settings may be adjusted. The microwave settings may be adjusted for one or more preferred snacks. For instance, the microwave 628 may include multiple settings. One or more of the multiple settings may be adjusted for preparation of the one or more preferred snacks.

At block 1014, the persona may be downloaded to one or more additional smart appliances. For example, the smart appliance device 629 may download the persona to one or more smart appliances in the kitchen 604 or another location of the house 600. At block 1016, one or more preferred recipes may be downloaded to a smart refrigerator. For instance, the preferred recipes, which may be included in the persona, may be communicated or downloaded to the smart refrigerator 630.

In the description of method 1000, each of blocks 1004, 1006, 1008, 1010, 1012, 1014, and 1016 are performed. In some embodiments, a subset of blocks 1004, 1006, 1008, 1010, 1012, 1014, and 1016 may be performed.

Figure 11:
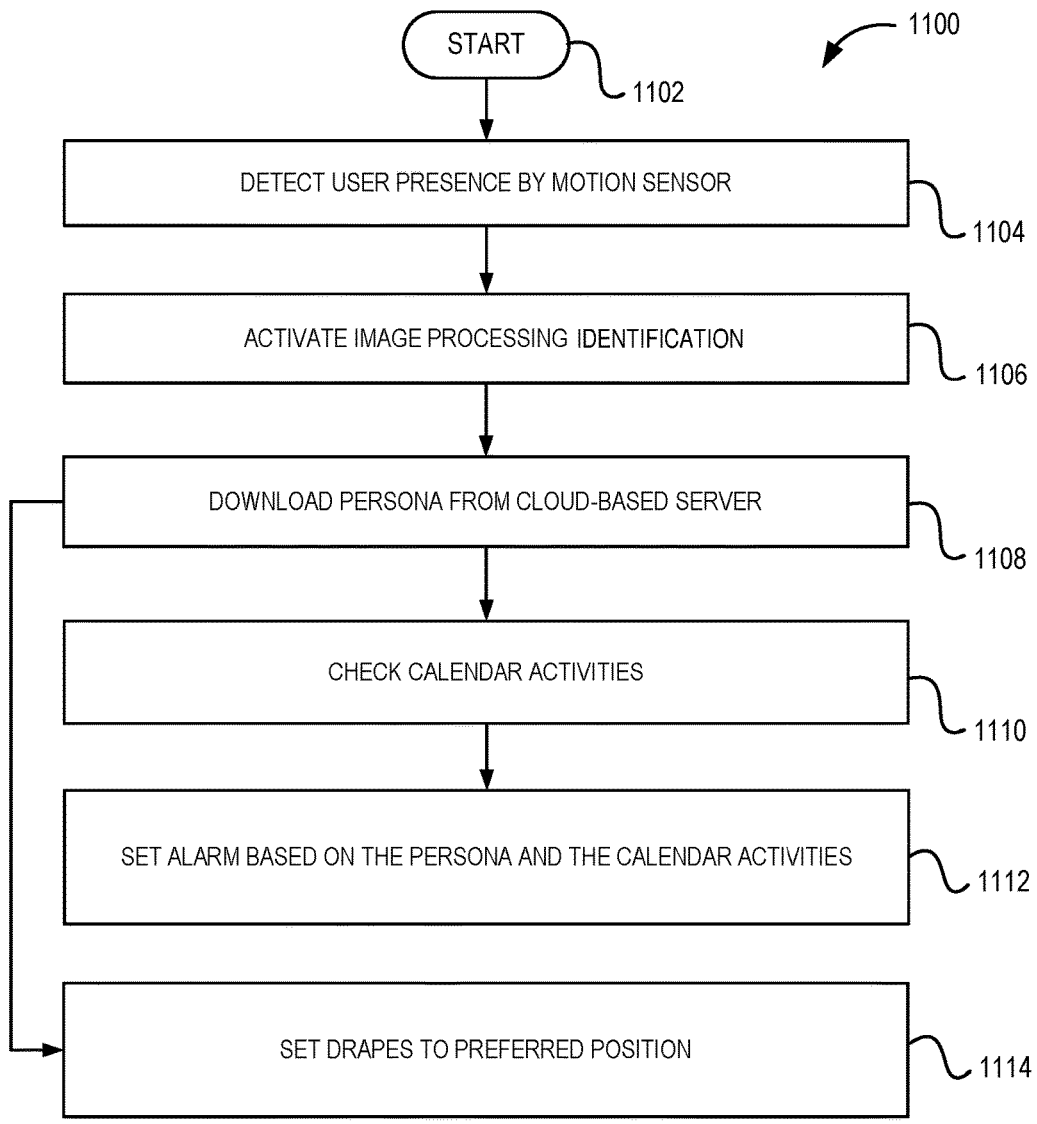
FIG. 11 is a flow chart of another example method of persona-based service delivery.

FIG. 11 is a flow chart of another example method 1100 of persona-based service delivery that may be implemented in a bedroom 606 of the house 600 of FIG. 6, in accordance with at least one embodiment described in this disclosure. Although illustrated as discrete blocks, various blocks in FIG. 11 may be divided into additional blocks, combined into fewer blocks, or eliminated, depending on the desired implementation. The method 1100 may be an example of the method 500 described elsewhere in this disclosure.

FIG. 11 is described with reference to the house 600 of FIG. 6. It may be understood with the benefit of this disclosure that the method 1100 may be performed in other houses or any other suitable environment. For example, any room that includes a motion sensor, which is represented by (S10/631 of FIG. 6), an image processing identification sensor (S11/633 of FIG. 6), a calendar sensor (S12/634 of FIG. 6), an alarm (D12/636 of FIG. 6), a set of drapes (D11/632 of FIG. 6), some combination thereof, or one or more suitable alternatives.

The method 1100 may begin at block 1102. At block 1104, a user presence may be detected by a motion sensor. For example, the motion sensor 631 of FIG. 6 may detect the presence of the user. At block 1106, an image processing identification sensor may be activated. In some embodiments, the image processing identification sensor may be activated in response to detection of the user by the motion sensor. For example, the image processing identification sensor 633 may be activated in response to the motion sensor 631 detecting the user.

At block 1108, a persona may be downloaded. The persona may be downloaded from a cloud-based server such as the cloud-based server 124 of FIG. 1. The persona may be downloaded by one or more of the motion sensor 631 and the image processing identification sensor 633. The persona may be communicated to one or more other devices or sensors (e.g., D11-D12 and S10-S12).

At block 1110, one or more calendar activities may be checked. The calendar activities may be included in the persona. For example, the calendar sensor 634 may check calendar activities in the persona. At block 1112, an alarm may be set. The alarm may be based on the persona and the calendar activities. For example, the alarm 636 may set one or more alarms based on the persona and the calendar activities. The calendar activities may be communicated from the calendar sensor 634. The persona may be communicated from the calendar sensor 634, the motion sensor 631, the image processing identification sensor 633, the cloud-based server 124, or some combination thereof. At block 1114, drapes may be set to a preferred position. For example, the set of drapes 632 may be set to the preferred position, which may be based on the persona.

In the description of method 1100, each of blocks 1104, 1106, 1108, 1110, 1112, and 1114 are performed. In some embodiments, a subset of blocks 1104, 1106, 1108, 1110, 1112, and 1114 may be performed.

The methods 700-1100 may be performed in an operating environment such as the service delivery system 100 of FIG. 1. The methods 700-1100 may be programmably performed in some embodiments by the adaptation engine 108, the adaptation module 111, the service device 117, the sensor 115, or some combination thereof described with reference to FIG. 1. In some embodiments, the adaptation engine 108, the adaptation module 111, the service device 117, the sensor 115 or another computing system may include or may be communicatively coupled to a non-transitory computer-readable medium (e.g., the memory 1208 of FIG. 12) having stored thereon programming code or instructions that are executable by one or more processors (such as the processor 1204 of FIG. 12) to cause performance or control performance of the methods 700-1100. Additionally or alternatively, the adaptation engine 108, the adaptation module 111, the service device 117, the sensor 115 or the computing system may include the processor 1204 described elsewhere in this disclosure that is configured to execute computer instructions to cause performance or control performance of the methods 700-1100.

Figure 12:
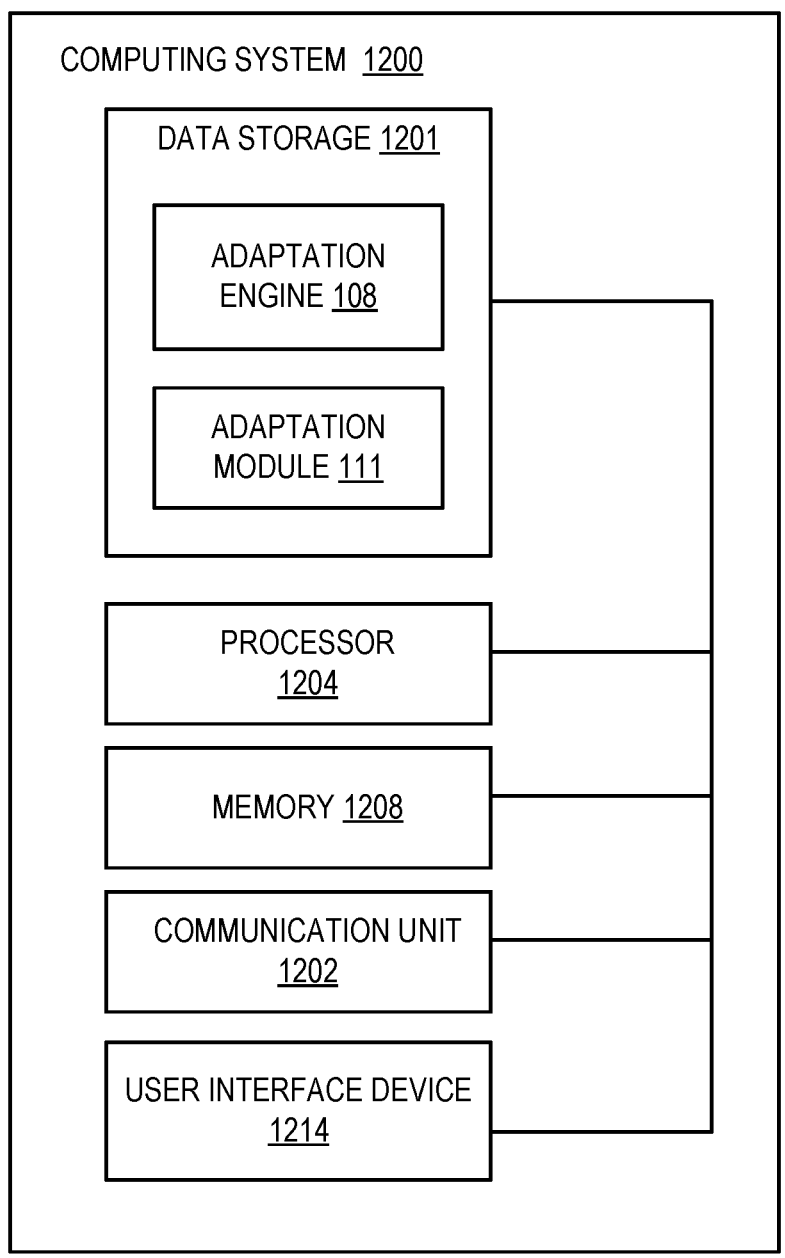
FIG. 12 illustrates an example computing system configured for persona-based service delivery, all in accordance with at least one embodiment described in this disclosure.

FIG. 12 illustrates an example computing system 1200 configured for persona-based service delivery. The computing system 1200 may be implemented in the service delivery system 100 of FIG. 1, for instance. Examples of the computing system 1200 may include the cloud-based server 124, the sensor 115, or the service device 117. The computing system 1200 may include one or more processors 1204, a memory 1208, a communication unit 1202, the user interface device 1214, and a data storage 1201 that includes the adaptation engine 108 and/or the adaptation module 111 (collectively, engine/module 108/111).

The processor 1204 may include any suitable special-purpose or general-purpose computer, computing entity, or processing device including various computer hardware or software modules and may be configured to execute instructions stored on any applicable computer-readable storage media. For example, the processor 1204 may include a microprocessor, a microcontroller, a digital signal processor (DSP), an ASIC, an FPGA, or any other digital or analog circuitry configured to interpret and/or to execute program instructions and/or to process data.

Although illustrated as a single processor in FIG. 12, the processor 1204 may more generally include any number of processors configured to perform individually or collectively any number of operations described in the present disclosure. Additionally, one or more of the processors 1204 may be present on one or more different electronic devices or computing systems. In some embodiments, the processor 1204 may interpret and/or execute program instructions and/or process data stored in the memory 1208, the data storage 1201, or the memory 1208 and the data storage 1201. In some embodiments, the processor 1204 may fetch program instructions from the data storage 1201 and load the program instructions in the memory 1208. After the program instructions are loaded into the memory 1208, the processor 1204 may execute the program instructions.

The memory 1208 and the data storage 1201 may include computer-readable storage media for carrying or having computer-executable instructions or data structures stored thereon. Such computer-readable storage media may include any available media that may be accessed by a general-purpose or special-purpose computer, such as the processor 1204. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 1204 to perform a certain operation or group of operations.

The communication unit 1202 may include one or more pieces of hardware configured to receive and send communications. In some embodiments, the communication unit 1202 may include one or more of an antenna, a wired port, and modulation/demodulation hardware, among other communication hardware devices. In particular, the communication unit 1202 may be configured to receive a communication from outside the computing system 1200 and to present the communication to the processor 1204 or to send a communication from the processor 1204 to another device or network (e.g., 122 of FIG. 1).

The user interface device 1214 may include one or more pieces of hardware configured to receive input from and/or provide output to a user. In some embodiments, the user interface device 1214 may include one or more of a speaker, a microphone, a display, a keyboard, a touch screen, or a holographic projection, among other hardware devices.

The engine/module 108/111 may include program instructions stored in the data storage 1201. The processor 1204 may be configured to load the engine/module 108/111 into the memory 1208 and execute the engine/module 108/111. Alternatively, the processor 1204 may execute the engine/module 108/111 line-by-line from the data storage 1201 without loading them into the memory 1208. When executing the engine/module 108/111, the processor 1204 may be configured to perform a participation verification process as described elsewhere in this disclosure.

Modifications, additions, or omissions may be made to the computing system 1200 without departing from the scope of the present disclosure. For example, in some embodiments, the computing system 1200 may not include the user interface device 1214. In some embodiments, the different components of the computing system 1200 may be physically separate and may be communicatively coupled via any suitable mechanism. For example, the data storage 1201 may be part of a storage device that is separate from a server, which includes the processor 1204, the memory 1208, and the communication unit 1202, that is communicatively coupled to the storage device.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include tangible or non-transitory computer-readable storage media including RAM, ROM, EEPROM, CD-ROM or other optical disk storage, magnetic disk storage or other magnetic storage devices, or any other non-transitory storage medium which may be used to carry or store desired program code in the form of computer-executable instructions or data structures and which may be accessed by a general-purpose or special-purpose computer. Combinations of the above may also be included within the scope of computer-readable media.

Computer-executable instructions comprise, for example, instructions and data which cause a general-purpose computer, special-purpose computer, or special-purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module," "component," and/or "engine" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modules running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present invention have been described in detail, it should be understood that the various changes, substitutions, and alterations could be made hereto without departing from the spirit and scope of the invention.

What is claimed is:

1. A method of persona-based service delivery, the method comprising:

receiving, by a cloud-based server, use data from a sensor that monitors a current environment and from a service device that is located in the current environment while a particular user interacts with the service device in the current environment;

based on the use data, developing, by the cloud-based server, a preference of the particular user that reflects the interaction by the particular user with the service device as monitored by the sensor;

based on the preference, further developing, by the cloud-based server, a command instruction that is configured to adapt the current environment through modification of a physical operational condition of the service device consistent with the preference upon receipt of the command instruction;

storing, by the cloud-based server, a persona that is specific to the particular user, the persona including the preference and the command instruction for the particular user in the current environment;

subsequently receiving, by the cloud-based server, collected data that includes a user characteristic of the particular user in the current environment from the sensor in the current environment; and in response to receipt of the collected data, downloading, by the cloud-based server, the persona of the particular user to the sensor; and adapting the current environment through modification of the physical operational condition of the service device based on the command instruction of the persona.

2. The method of claim 1, wherein the downloading occurs in real time or substantially real time upon receipt of the collected data.

3. The method of claim 1, wherein:
the persona includes verification data that is used to confirm the collected data is sampled from the particular user, and
prior to the modifying the physical operational condition, the collected data is confirmed to be sampled from the particular user based on the verification data.

4. The method of claim 1, wherein the persona includes a download initiation command that is configured to initiate download of the persona by the service device.

5. The method of claim 1, further comprising:
receiving, by the cloud-based server, additional use data from the sensor that continues to monitor the current environment and from the service device while the particular user subsequently interacts with the service device in the current environment;
based on the additional use data, modifying, by the cloud-based server, the preference of the particular user that reflects the subsequent interaction by the particular user with the service device;
altering, by the cloud-based server, the command instruction to adapt the current environment through modification of the physical operational condition of the service device consistent with a modified preference upon receipt of an altered command instruction; and
updating, by the cloud-based server, the persona to include the modified preference and the altered command instruction.

6. The method of claim 1, wherein the preference is further configured for the particular user in one or more other environments that are a same type of environment as the current environment and for one or more other service devices that are a same type of device as the service device in the current environment.

7. The method of claim 1, wherein the sensor and the service device are integrated into a single device.

8. The method of claim 1, wherein the current environment includes a vehicle, a clinical environment, a work environment, a shopping environment, or a residential environment.

9. The method of claim 1, wherein:
the service device includes a home entry device, garage door opener, vehicle keyless ignition, a vehicle interior component configuration, navigation settings, a heating ventilation and air conditioning (HVAC) device, a refrigerator, a coffee maker, a washing machine, a light, a lighting control device, a keyless ignition, a vehicle operator entertainment device, a navigation device, a vehicle HVAC device, a computing device, a conference room device, a thermostat, and a productivity tool; and the preference includes a health record, a medication history, an allergy, PCP information, lab tests and appointments, a preferred specialist, computer access, a payment method, a coupon, a shopping list, a buying pattern, a brand preference, a productivity tool setting, a temperature, a lighting setting, a conference room configuration preference, an entertainment device setting, and an entertainment preference.

10. A non-transitory computer-readable medium having encoded therein programming code executable by one or more processors to perform or control performance of operations comprising:
receiving, by a cloud-based server, use data from a sensor that monitors a current environment and from a service device that is located in the current environment while a particular user interacts with the service device in the current environment;
based on the use data, developing, by the cloud-based server, a preference of the particular user that reflects the interaction by the particular user with the service device as monitored by the sensor;
based on the preference, further developing, by the cloud-based server, a command instruction that is configured to adapt the current environment through modification of a physical operational condition of the service device consistent with the preference upon receipt of the command instruction;
storing, by the cloud-based server, a persona that is specific to the particular user, the persona including the preference and the command instruction for the particular user in the current environment;
subsequently receiving, by the cloud-based server, collected data that includes a user characteristic of the particular user in the current environment from the sensor in the current environment; and
in response to receipt of the collected data, downloading, by the cloud-based server, the persona of the particular user to the sensor; and
adapting the current environment through modification of the physical operational condition of the service device based on the command instruction of the persona.

11. The non-transitory computer-readable medium of claim 10, wherein the downloading occurs in real time or substantially real time upon receipt of the collected data.

12. The non-transitory computer-readable medium of claim 10, wherein:
the persona includes verification data that is used to confirm the collected data is sampled from the particular user, and
prior to the modifying the physical operational condition, the collected data is confirmed to be sampled from the particular user based on the verification data.

13. The non-transitory computer-readable medium of claim 10, wherein the persona includes a download initiation command that is configured to initiate download of the persona by the service device.

14. The non-transitory computer-readable medium of claim 10, wherein the operations further comprise:
receiving, by the cloud-based server, additional use data from the sensor that continues to monitor the current environment and from the service device while the particular user subsequently interacts with the service device in the current environment;

based on the additional use data, modifying, by the cloud-based server, the preference of the particular user that reflects the subsequent interaction by the particular user with the service device;

altering, by the cloud-based server, the command instruction to adapt the current environment through modification of the physical operational condition of the service device consistent with a modified preference upon receipt of an altered command instruction; and updating, by the cloud-based server, the persona to include the modified preference and the altered command instruction.

15. The non-transitory computer-readable medium of claim 10, wherein the preference is further configured for the particular user in one or more other environments that are a same type of environment as the current environment and for one or more other service devices that are a same type of device as the service device in the current environment.

16. The non-transitory computer-readable medium of claim 10, wherein the sensor and the service device are integrated into a single device.

17. The non-transitory computer-readable medium of claim 10, wherein the current environment includes a vehicle, a clinical environment, a work environment, a shopping environment, or a residential environment.

18. The non-transitory computer-readable medium of claim 10, wherein:

the service device includes a home entry device, garage door opener, vehicle keyless ignition, a vehicle interior component configuration, navigation settings, a heating ventilation and air conditioning (HVAC) device, a refrigerator, a coffee maker, a washing machine, a light, a lighting control device, a keyless ignition, a vehicle operator entertainment device, a navigation device, a vehicle HVAC device, a computing device, a conference room device, a thermostat, and a productivity tool; and the preference includes a health record, a medication history, an allergy, PCP information, lab tests and appointments, a preferred specialist, computer access, a payment method, a coupon, a shopping list, a buying pattern, a brand preference, a productivity tool setting, a temperature, a lighting setting, a conference room configuration preference, an entertainment device setting, and an entertainment preference.

* * * * *